(12) United States Patent
Shimizu et al.

(10) Patent No.: US 10,997,846 B2
(45) Date of Patent: *May 4, 2021

(54) LIGHTING APPARATUS

(71) Applicant: MAXELL, LTD., Kyoto (JP)

(72) Inventors: Takuya Shimizu, Kyoto (JP);
Katsuyuki Watanabe, Kyoto (JP);
Hiroyuki Urata, Kyoto (JP); Tatsuya Ishikawa, Kyoto (JP); Nobuo Masuoka, Kyoto (JP)

(73) Assignee: MAXELL, LTD., Kyoto (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/877,536

(22) Filed: May 19, 2020

(65) Prior Publication Data
US 2020/0279470 A1    Sep. 3, 2020

Related U.S. Application Data

(63) Continuation of application No. 16/285,645, filed on Feb. 26, 2019, now Pat. No. 10,699,552, which is a (Continued)

(30) Foreign Application Priority Data

Dec. 26, 2014  (JP) .................. 2014-265565
Jul. 17, 2015  (JP) .................. 2015-143049

(51) Int. Cl.
*G03B 21/10*     (2006.01)
*G08B 21/18*     (2006.01)
(Continued)

(52) U.S. Cl.
CPC ........... *G08B 21/185* (2013.01); *G03B 17/54* (2013.01); *G03B 21/10* (2013.01); *G03B 21/28* (2013.01);
(Continued)

(58) Field of Classification Search
CPC ...... G03B 21/10; G03B 21/14; G03B 21/145; G03B 21/2033; G03B 21/2086;
(Continued)

(56) References Cited

U.S. PATENT DOCUMENTS 9,039,234 B2    5/2015  Kasuga
9,348,205 B2    5/2016  Kasuga
(Continued)

FOREIGN PATENT DOCUMENTS

CN    203131670 U    8/2013
CN    103307519 A    9/2013
(Continued)

OTHER PUBLICATIONS

International Search Report of PCT/JP2015/084819 dated Mar. 15, 2016.
(Continued)

*Primary Examiner* — Sultan Chowdhury
(74) *Attorney, Agent, or Firm* — Mattingly & Malur, PC

(57) ABSTRACT

A lighting apparatus with an image-projecting function that is convenient for a user can be provided. The lighting apparatus includes: an illuminating unit that emits illumination light; and a projection-type image display unit that projects an image. The projection-type image display unit is configured so that a setting menu screen settable about an image displayed by the projection-type image display unit can be displayed.

3 Claims, 26 Drawing Sheets

US 10,997,846 B2
Page 2

Related U.S. Application Data continuation of application No. 15/538,675, filed as application No. PCT/JP2015/084819 on Dec. 11, 2015, now Pat. No. 10,262,519.

(51) Int. Cl.

| | | |
|---|---|---|
| G03B 17/54 | (2021.01) | |
| G03B 21/28 | (2006.01) | |
| G03B 29/00 | (2021.01) | |
| G06F 3/042 | (2006.01) | |
| H05B 45/20 | (2020.01) | |
| H05B 47/10 | (2020.01) | |
| H05B 47/12 | (2020.01) | |
| H05B 47/20 | (2020.01) | |
| H05B 47/105 | (2020.01) | |
| H05B 47/175 | (2020.01) | |
| G06F 3/01 | (2006.01) | |
| F21S 8/04 | (2006.01) | |
| F21S 8/06 | (2006.01) | |
| F21V 23/04 | (2006.01) | |
| F21Y 115/10 | (2016.01) | |
| G08B 21/10 | (2006.01) | |
| G06F 3/0482 | (2013.01) | |
| G06F 3/0484 | (2013.01) | |

(52) U.S. Cl.
CPC .......... *G03B 29/00* (2013.01); *G06F 3/017* (2013.01); *G06F 3/0425* (2013.01); *G06F 3/0426* (2013.01); *H05B 45/20* (2020.01); *H05B 47/10* (2020.01); *H05B 47/105* (2020.01); *H05B 47/12* (2020.01); *H05B 47/175* (2020.01); *H05B 47/20* (2020.01); F21S 8/04 (2013.01); F21S 8/06 (2013.01); F21V 23/04 (2013.01); F21Y 2115/10 (2016.08); G06F 3/0482 (2013.01); G06F 3/04847 (2013.01); G08B 21/10 (2013.01)

(58) Field of Classification Search
CPC .. H04N 9/3161; H04N 9/3185; H04N 9/3194; G06F 3/017; G06F 3/0426; G06F 3/0482; G06F 3/04847; G08B 21/185; H05B 47/10; H05B 47/12; H05B 47/20; H05B 47/105; H05B 47/175
See application file for complete search history.

(56) References Cited

U.S. PATENT DOCUMENTS

| | | | |
|---|---|---|---|
| 2006/0016966 | A1 | 1/2006 | Hughes |
| 2008/0111976 | A1 | 5/2008 | Takito |
| 2008/0180643 | A1 | 7/2008 | Endo |
| 2009/0036158 | A1 | 2/2009 | Fujinawa |
| 2009/0244376 | A1 | 10/2009 | Asano et al. |
| 2010/0052926 | A1 | 3/2010 | Oku |
| 2010/0128231 | A1 | 5/2010 | Furui |
| 2010/0289664 | A1 | 11/2010 | Mizushima et al. |
| 2011/0292303 | A1 | 12/2011 | Nimura et al. |
| 2012/0013857 | A1 | 1/2012 | Yoshikawa |
| 2012/0019165 | A1 | 1/2012 | Igaki et al. |
| 2012/0040716 | A1* | 2/2012 | Kuncl .................. G06F 1/1626 455/556.1 |
| 2013/0063700 | A1 | 3/2013 | Yamaguchi |
| 2013/0163232 | A1 | 6/2013 | Kasuga |
| 2014/0022463 | A1 | 1/2014 | Kinebuchi et al. |
| 2014/0035964 | A1 | 2/2014 | Kasuga |
| 2014/0043544 | A1 | 2/2014 | Kasuga |
| 2014/0098303 | A1 | 4/2014 | Kasuga |
| 2014/0191947 | A1* | 7/2014 | Sharma ................ G06F 3/0317 345/156 |
| 2014/0244166 | A1* | 8/2014 | Klancher ............. G08B 21/185 701/515 |
| 2015/0022788 | A1 | 1/2015 | Shinha |
| 2015/0177601 | A1 | 6/2015 | Imai |
| 2017/0031530 | A1 | 2/2017 | Ikeda |

FOREIGN PATENT DOCUMENTS

| | | |
|---|---|---|
| CN | 103672631 A | 3/2014 |
| JP | 07-264527 A | 10/1995 |
| JP | 09-139905 A | 5/1997 |
| JP | 10-187034 A | 7/1998 |
| JP | 11-144510 A | 5/1999 |
| JP | 2003-016831 A | 1/2003 |
| JP | 2004-037918 A | 2/2004 |
| JP | 2004-078150 A | 3/2004 |
| JP | 2004-184768 A | 7/2004 |
| JP | 2004-233692 A | 8/2004 |
| JP | 2004-336615 A | 11/2004 |
| JP | 2005099588 A | 4/2005 |
| JP | 2006-086024 A | 3/2006 |
| JP | 2006-162832 A | 6/2006 |
| JP | 2006284626 A | 10/2006 |
| JP | 2007-027072 A | 2/2007 |
| JP | 2007133694 A | 5/2007 |
| JP | 2007226006 A | 9/2007 |
| JP | 2008-077979 A | 4/2008 |
| JP | 2008-180837 A | 8/2008 |
| JP | 2008-185757 A | 8/2008 |
| JP | 2009076397 A | 4/2009 |
| JP | 2009-145526 A | 7/2009 |
| JP | 2009-186927 A | 8/2009 |
| JP | 2009-237337 A | 10/2009 |
| JP | 2010-130225 A | 6/2010 |
| JP | 2011-175780 A | 9/2011 |
| JP | 2011-248205 A | 12/2011 |
| JP | 2011-253025 A | 12/2011 |
| JP | 2012-27054 A | 2/2012 |
| JP | 2012-069503 A | 4/2012 |
| JP | 2012-104096 A | 5/2012 |
| JP | 2012-174112 A | 9/2012 |
| JP | 2012-186118 A | 9/2012 |
| JP | 2013-25409 A | 2/2013 |
| JP | 2013-152922 A | 8/2013 |
| JP | 2013-167769 A | 8/2013 |
| JP | 2013150035 A | 8/2013 |
| JP | 2014-021428 A | 2/2014 |
| JP | 2014-032750 A | 2/2014 |
| JP | 2014-035522 A | 2/2014 |
| JP | 2014044641 A | 3/2014 |
| JP | 2014-78323 A | 5/2014 |
| JP | 2014-120400 A | 6/2014 |
| WO | 2010/044204 A1 | 4/2010 |

OTHER PUBLICATIONS

Japanese Office Action received in corresponding Japanese Application No. 2016-566113 dated May 29, 2018.

Takani, A. et al., "The Cooperative Work in Tabletop UI (1)—Extraction of Problems", The 2014 Institute of Electronics, Information, and Communication Engineers General Conference, Mar. 18, 2014.

Japanese Office Action received in corresponding Japanese Application No. 2019-162260 dated Sep. 23, 2020.

* cited by examiner

FIG. 14

ILLUMINATING UNIT PROJECTOR (PJ) UNIT LIGHTING CONTROL EXAMPLE

| | OPERATION HARD | CONFIGURATION AND CONTROL |
|---|---|---|
| LIGHTING CONTROL EXAMPLE 1 | OPERATION INPUT UNIT 301 or WALL-MOUNTED OPERATION INPUT UNIT or REMOTE CONTROLLER | PROVIDE ANY OR EACH OF OPERATION HARD WITH ILLUMINATING UNIT ON/OFF OPERATION BUTTON AND PJ UNIT ON/OFF OPERATION BUTTON |
| LIGHTING CONTROL EXAMPLE 2 | OPERATION INPUT UNIT 301 or WALL-MOUNTED OPERATION INPUT UNIT (TOUCH SENSOR) | PROVIDE RESPECTIVE TOUCH SENSING AREAS OF ILLUMINATING UNIT AND PJ UNIT TO TURN ON/OFF EACH OF THEM |
| LIGHTING CONTROL EXAMPLE 3 | OPERATION INPUT UNIT 301 or WALL-MOUNTED OPERATION INPUT UNIT (TOUCH SENSOR) | SHARE TOUCH SENSING AREAS OF ILLUMINATING UNIT AND PJ UNIT TO CHANGE ON/OFF OF THEM BY TOGGLE-SWITCHING OPERATION INCLUDING ON/OFF OF ILLUMINATING UNIT AND ON/OFF OF PJ UNIT |
| LIGHTING CONTROL EXAMPLE 4 | OPERATION INPUT UNIT 301 or WALL-MOUNTED OPERATION INPUT UNIT (ROTARY SWITCH) | CHANGING OPERATION INCLUDING ON/OFF OF ILLUMINATING UNIT AND ON/OFF OF PJ UNIT BY ROTARY SWITCH |
| LIGHTING CONTROL EXAMPLE 5 | OPERATION INPUT UNIT 301 (DRAWSTRING TOGGLE SWITCH) | TOGGLE-SWITCHING OPERATION INCLUDING ON/OFF OF ILLUMINATING UNIT AND ON/OFF OF PJ UNIT BY DRAWSTRING TOGGLE SWITH |
| LIGHTING CONTROL EXAMPLE 6 | WALL-MOUNTED OPERATION INPUT UNIT HAVING SINGLE ON/OFF OPERATION UNIT, REMOTE CONTROLLER TURNS ON/OFF EACH OF ILLUMINATING/PJ UNITS | TURN ON ONLY ILLUMINATING UNIT BY ON OPERATION FROM WALL-MOUNTED OPERATION INPUT UNIT → MAKE POSSIBLE PJ ON/OFF OPERATION AND ILLUMINATING ON/OFF OPERATION FROM REMOTE CONTROLLER → TURN OFF ILLUMINATING AND PJ UNITS BY OFF OPERATION FROM WALL-MOUNTED OPERATION INPUT UNIT |

FIG. 15

ILLUMINATING UNIT · PROJECTOR (PJ) UNIT · LIGHTING STATE EXAMPLES

| | ILLUMINATING UNIT | PJ UNIT | MODIFICATION MODE ETC. |
|---|---|---|---|
| LIGHTING STATE 1 | OFF | OFF | |
| LIGHTING STATE 2 | ON | OFF | |
| LIGHTING STATE 3 | ON | ON | MODIFICATION MODES AS FOLLOWS ARE CONSIDERED AS LIGHTING STATE OF ILLUMINATING UNIT: (1) SAME AS LIGHTING STATE 2; BESIDES IT (2) SMALLER IN LIGHT AMOUNT THAN LIGHTING STATE 2; (3) SMALLER IN NUMBER OF LIGHTING LIGHT-EMITTING ELEMENTS THAN LIGHTING STATE 2; (4) CHANGE TO LIGHT DISTRIBUTION CHARACTERISTICS DIFFERENT FROM LIGHTING STATE 2; AND ETC. FURTHER, IN MODIFICATION MODES (2), (3), AND (4), PLURAL LIGHTING STATES MAY BE DIFFERENT IN LIGHT AMOUNT, NUMBER OF LIGHTING LIGHT-EMITTING ELEMENTS, AND LIGHT DISTRIBUTION CHARACTERISTICS. ALSO, ILLUMINATING UNIT MAY HAVE NO LIGHTING STATE 3. |
| LIGHTING STATE 4 | OFF | ON | |

CHANGED EXAMPLES BY TOGGLE-SWITCHING OPERATION

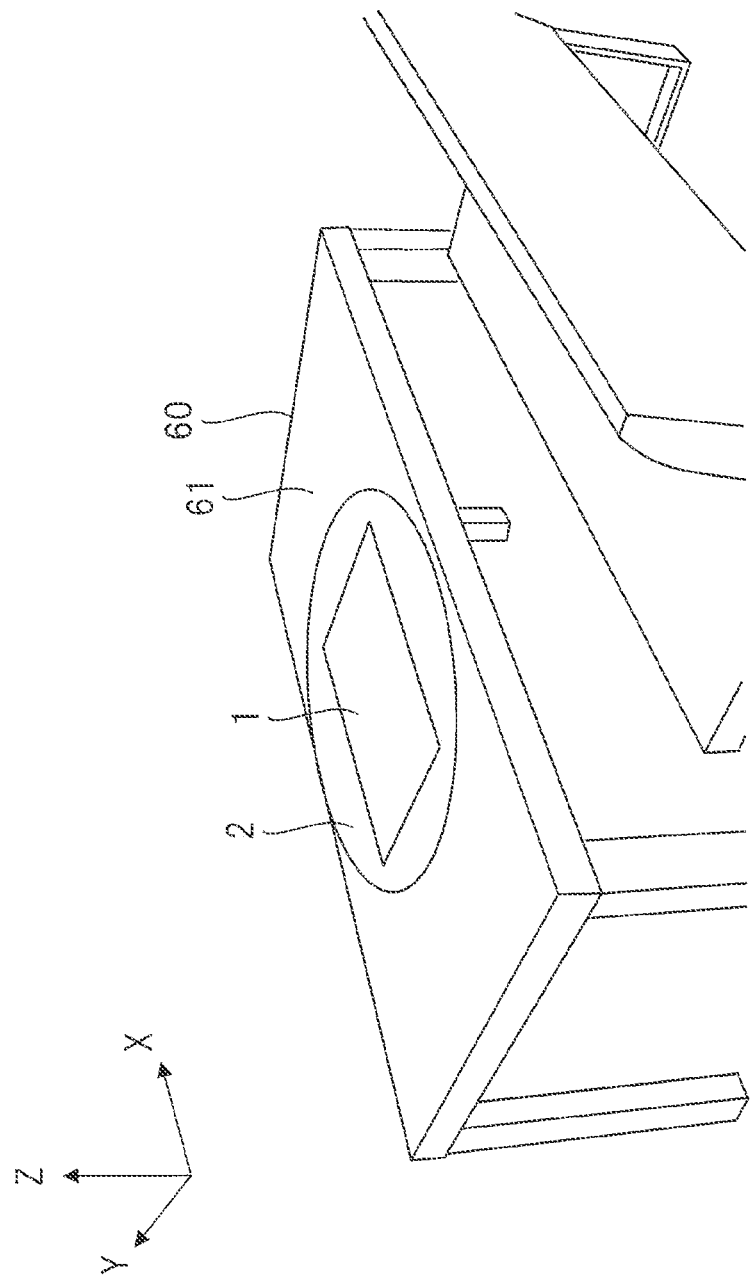

FIG. 17B
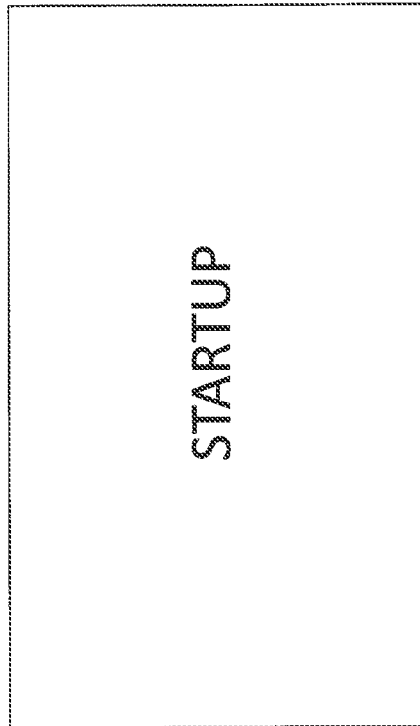
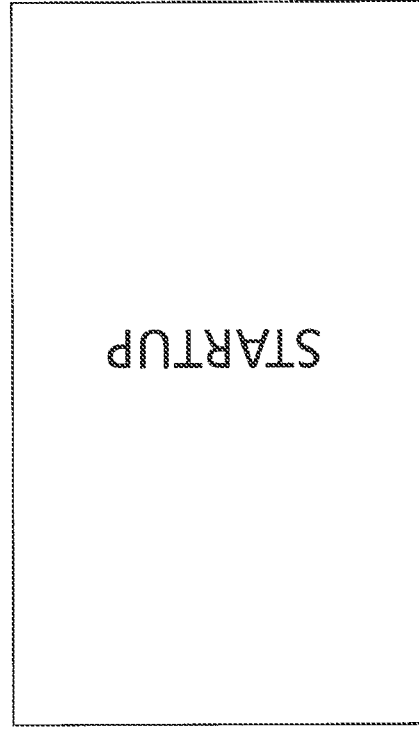
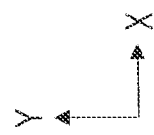

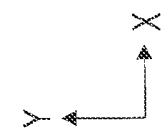
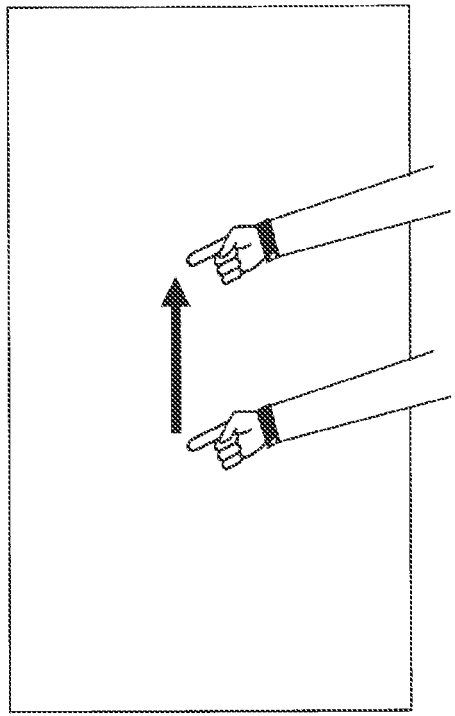
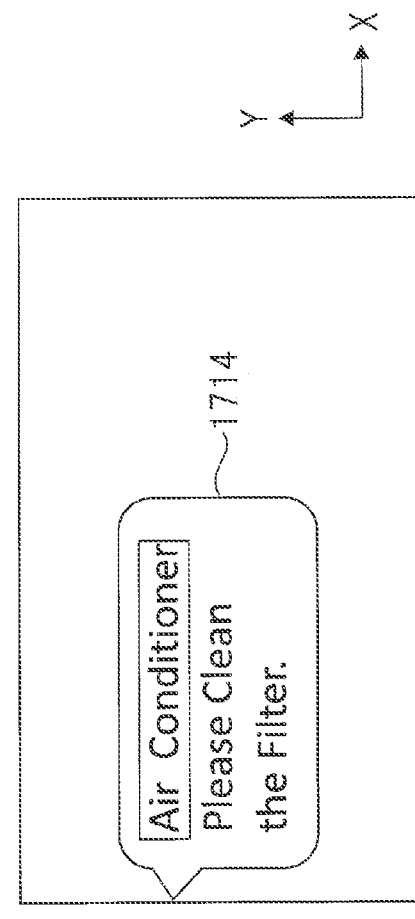
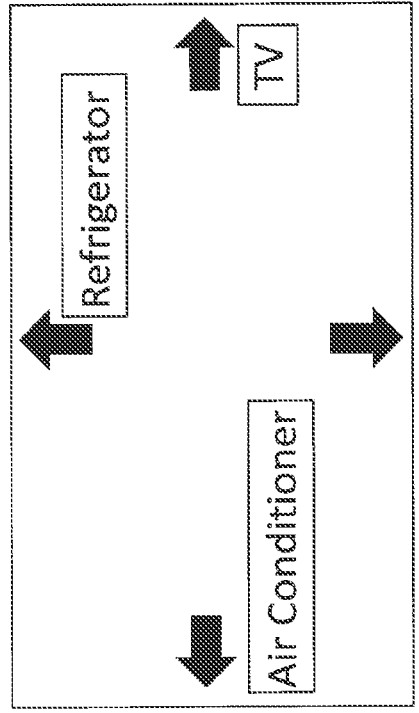
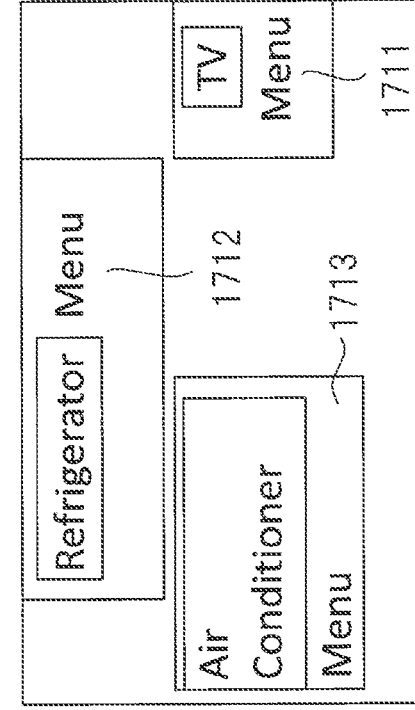
FIG. 17D

FIG. 17E
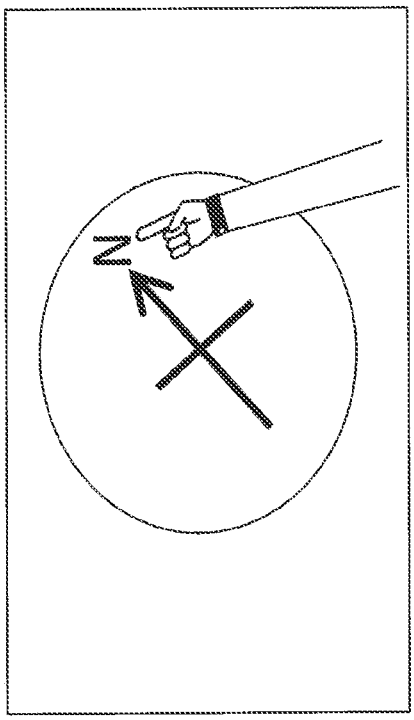
(1)
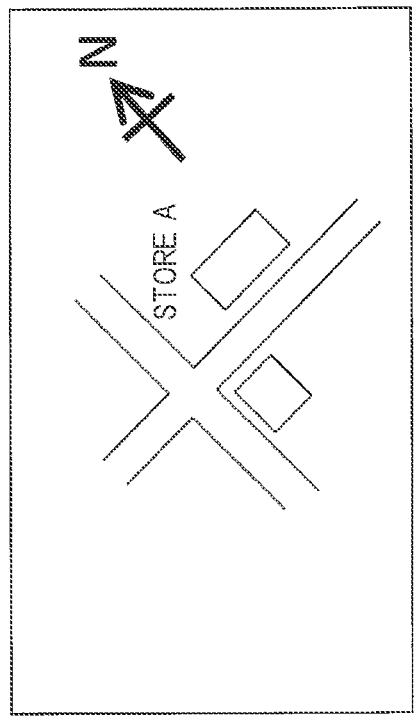
(2)
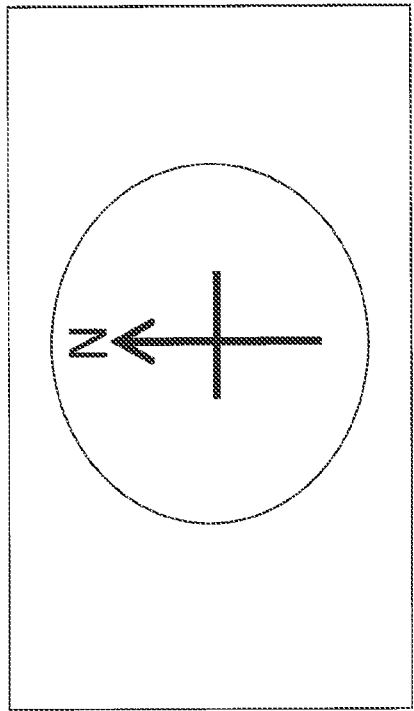
(3)
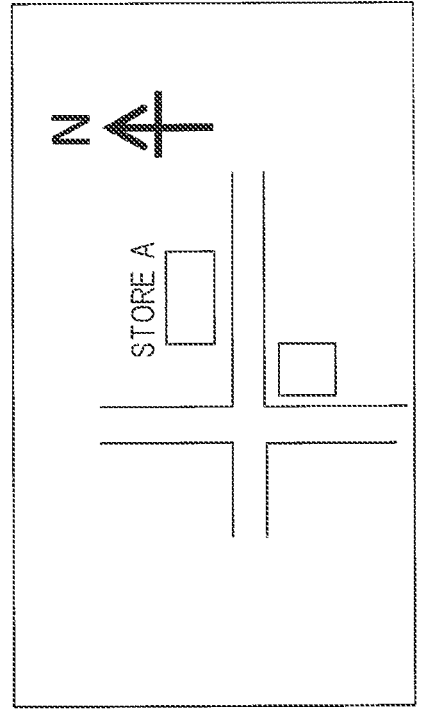
(4)

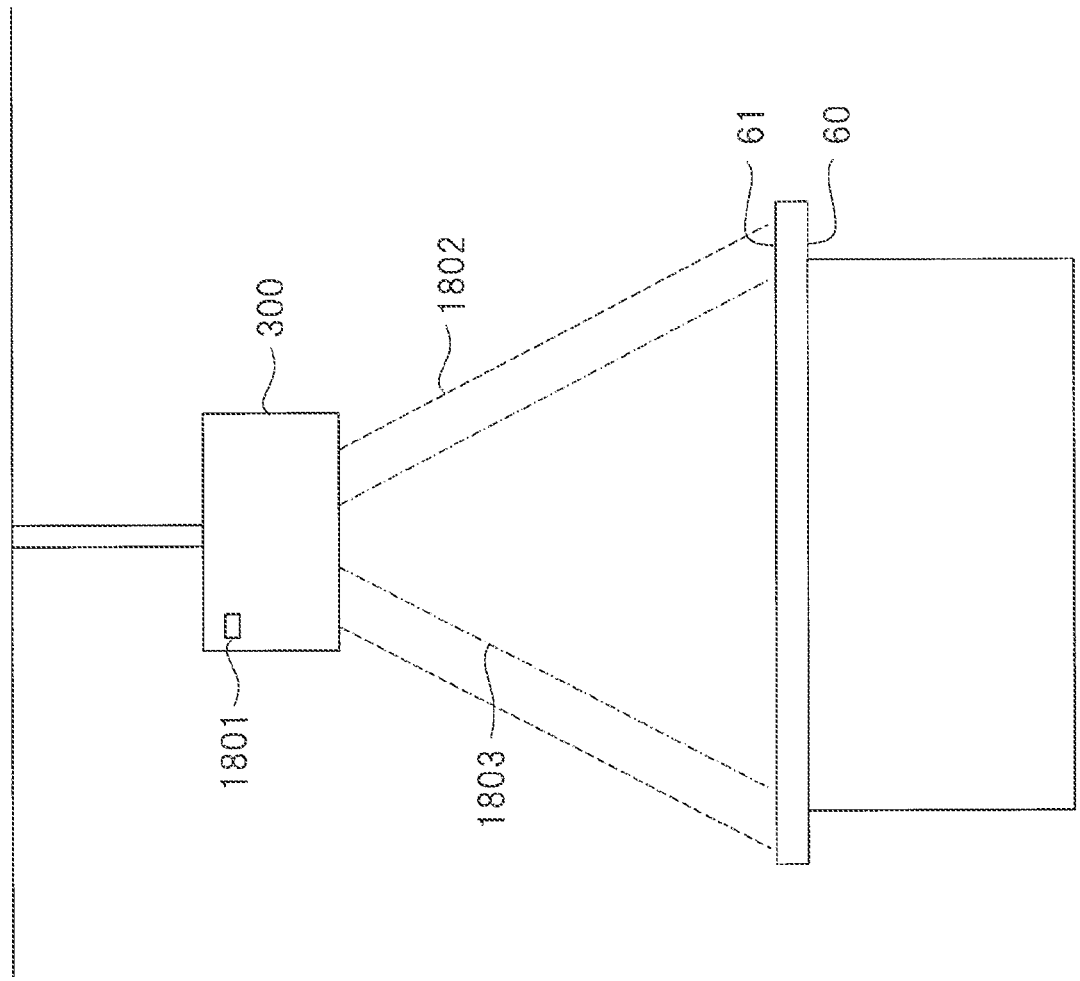

FIG. 18B
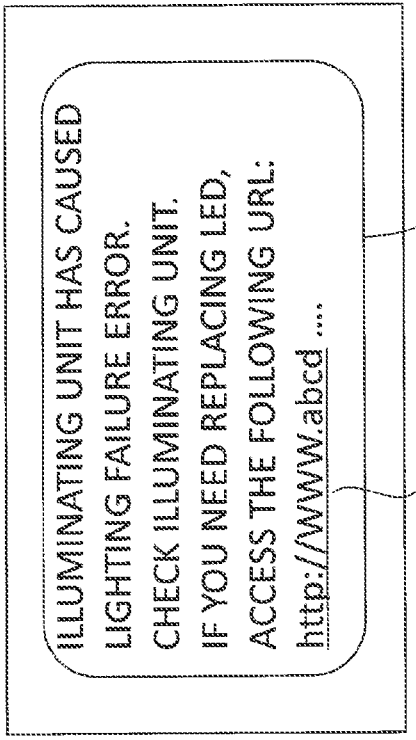
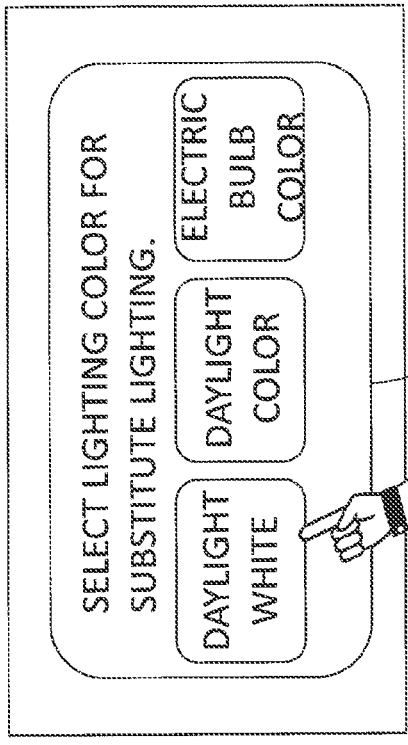
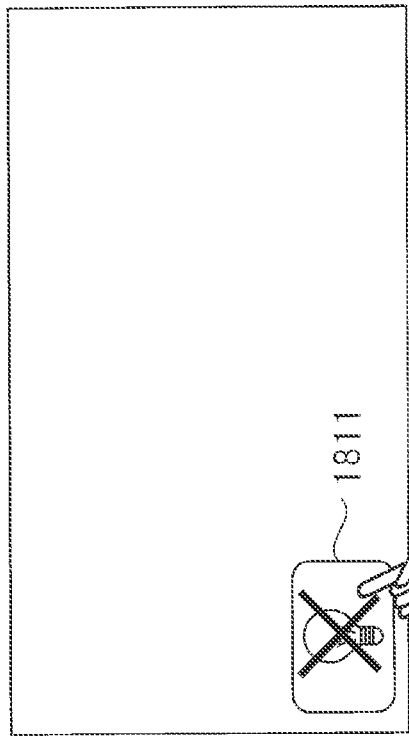
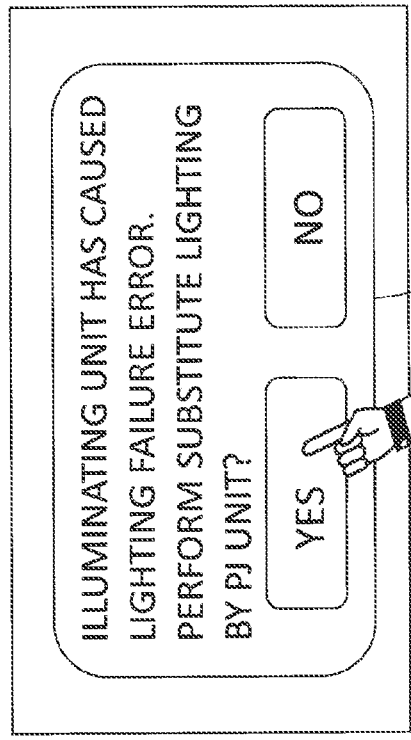

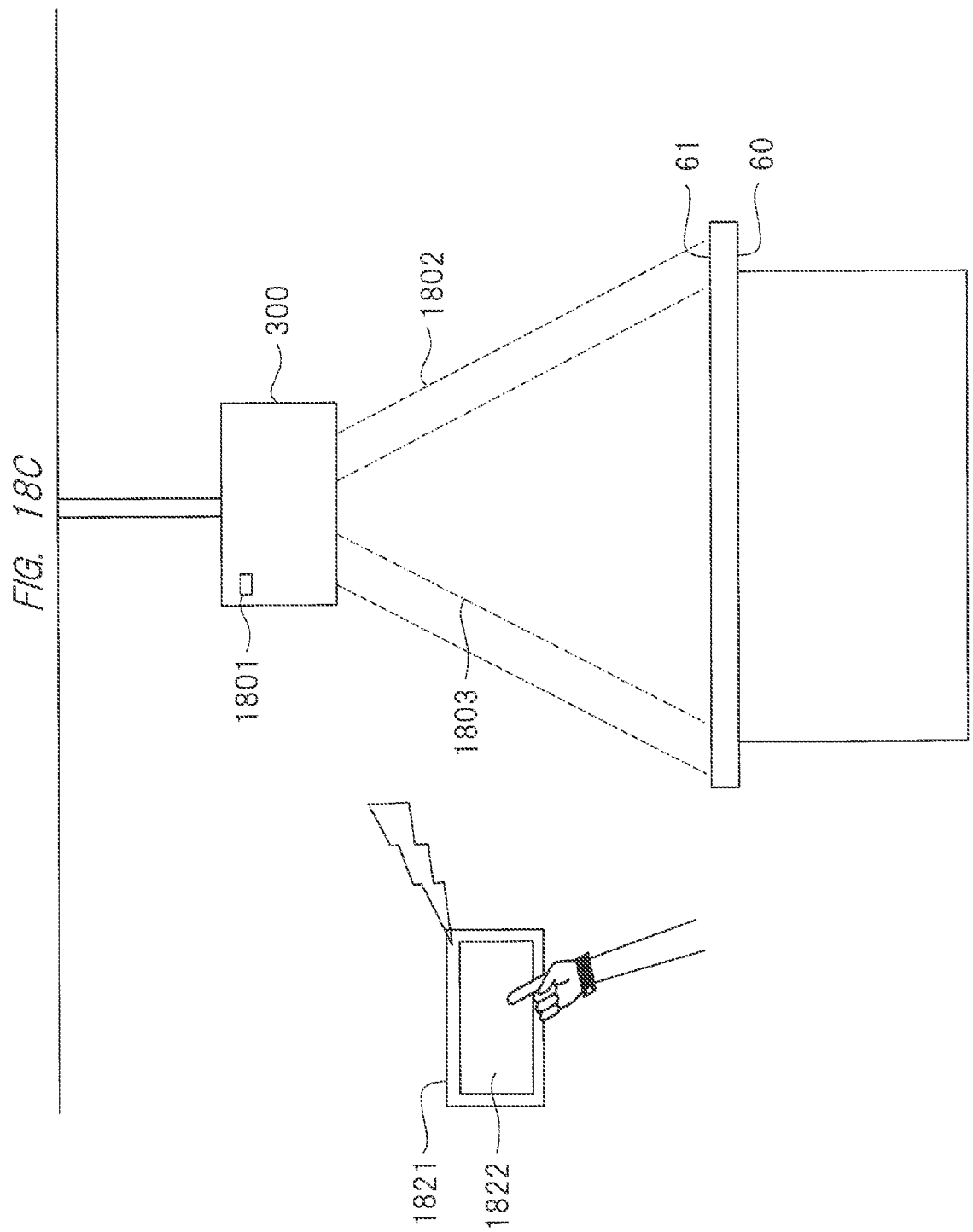

FIG. 18D
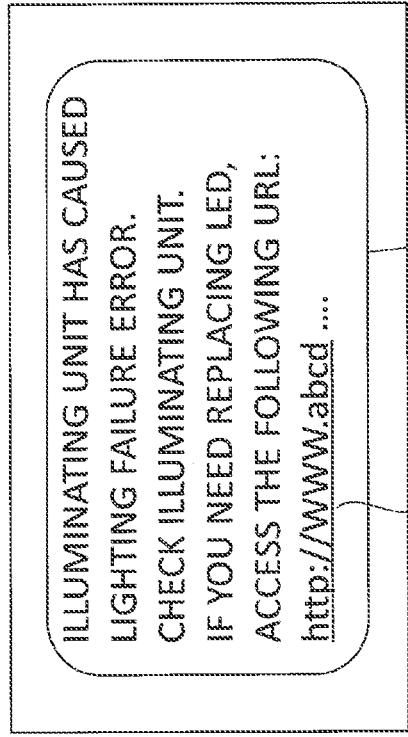
(1)
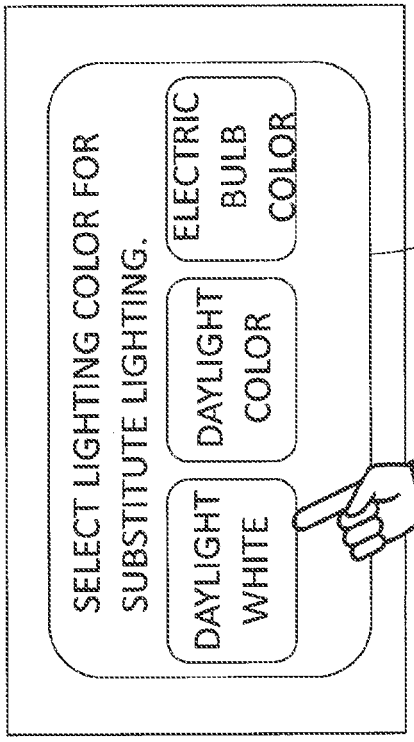
(2)
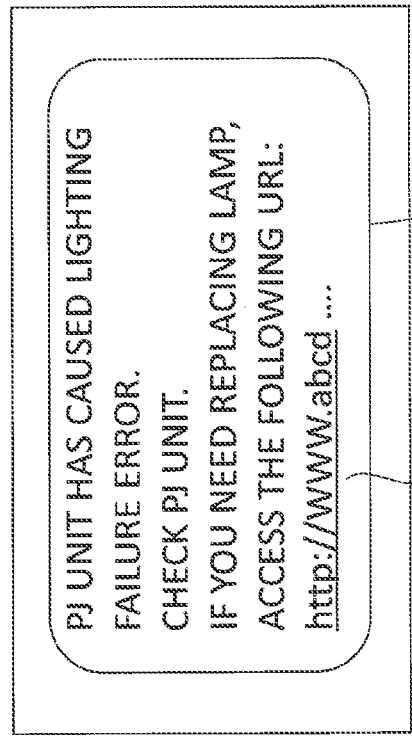
(3)
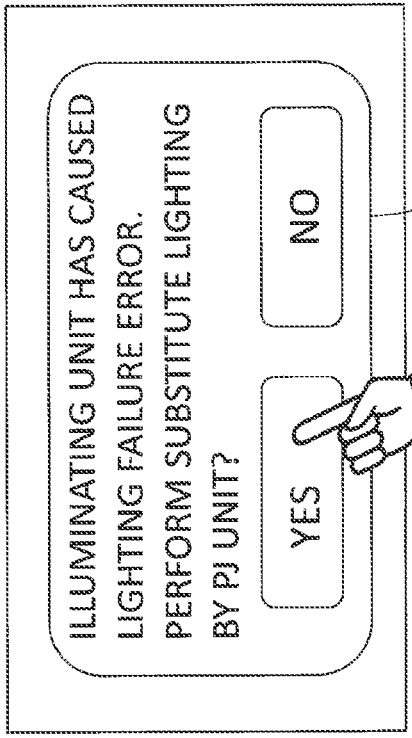
(4)

FIG. 19
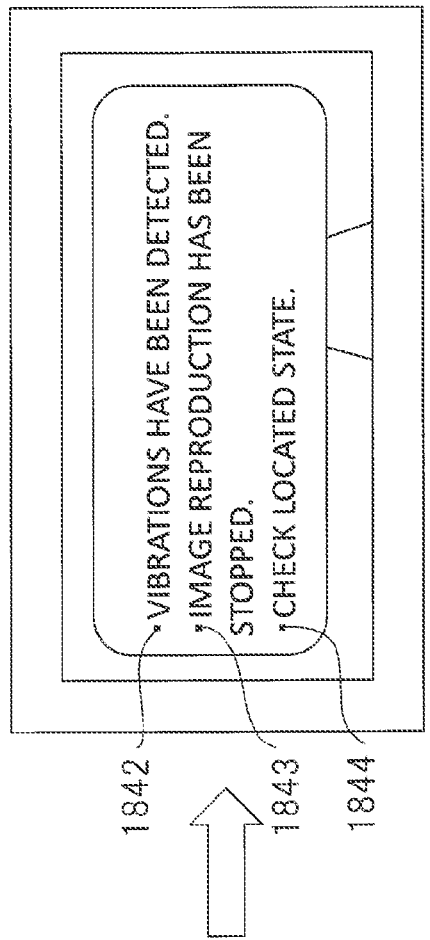
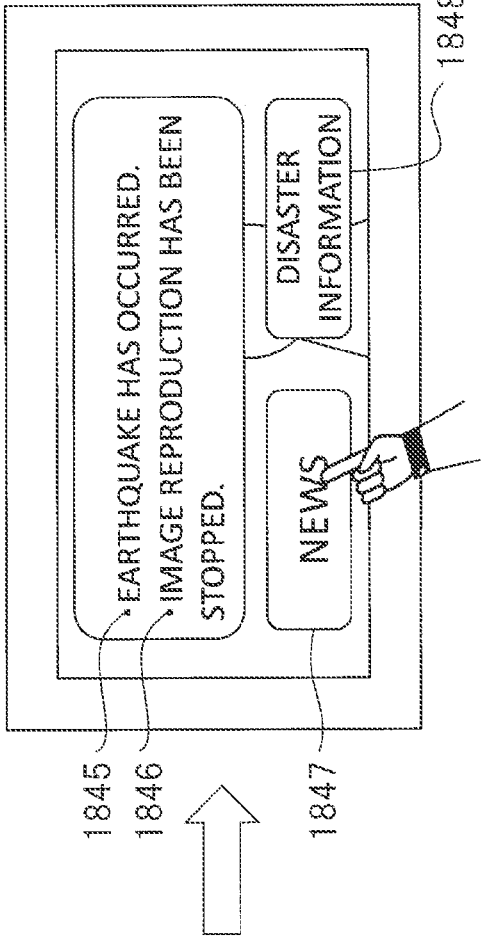

LIGHTING APPARATUS

TECHNICAL FIELD

The present invention relates to a lighting apparatus.

BACKGROUND ART

A technique of attaching a communication function module to a ceiling light, the communication function module being mounted on a ceiling or wall surface and allowing use of the module's various functions, is disclosed in Patent Document 1 as described below.

RELATED ART DOCUMENTS

Patent Documents

Patent document 1: Japanese Patent Application Laid-open No. 2003-16831

SUMMARY OF THE INVENTION

Problems to be Solved by the Invention

Patent document 1, however, does not disclose any technique concerning control of lighting of a projector and light emission from an illumination light source. Patent document 1, therefore, does not disclose any technique concerning control of: image projection by the projector, which serves as an image-projecting function in a lighting apparatus having an image-projecting function; and light emission from an illumination light source which is incorporated in the lighting apparatus having the image-projecting function. Patent Document 1 merely discloses a block diagram and simple outline of the projector and does not disclose a layout of an optical system and optical element making up the projector in the lighting apparatus or a layout of an optical unit in which arrangement of the optical system and optical element is taken into consideration. Thus, with regard to control of: image projection by the projector which serves as the image-projecting function in the lighting apparatus having the image-projecting function; and light emission from the illumination light source, which is incorporated in the lighting apparatus having the image-projecting function, Patent Document 1 does not disclose any layout of the optical system and optical element making up the projector in the lighting apparatus or any control in which the arrangement of the optical system and optical element is taken into consideration.

Patent Document 1 does not disclose any technique of projection image that is set by the lighting apparatus with the image-projecting function.

In the conventional technique, thus, there is insufficient consideration to user's convenience about control of lighting of the light source, or about projection-image setting processing by the lighting apparatus with the image-projecting function.

The present invention has been achieved in view of the above problems with the conventional technique, and it is therefore an object of the invention to provide a lighting apparatus with an image-projecting function that is further convenient for a user.

Means for Solving the Problems

As an aspect of the present invention, in order to achieve the above object, the lighting apparatus with the image-projecting function includes an illuminating unit that emits illumination light, and a projection-type image display unit that projects an image, and is structured to be capable of displaying a setting menu screen on which setting for the image displayed by the projection-type image display unit can be made.

Effects of the Invention

The present invention described above provides a lighting apparatus with an image-projecting function that is further convenient for the user.

BRIEF DESCRIPTIONS OF THE DRAWINGS

FIG. 14 is a drawing for explaining examples of control of lighting of a projector unit and an illuminating unit in the lighting apparatus according to the present invention;

FIG. 15 is a drawing for explaining examples of image projection by the projector unit and lighting states of the illumination light source of the illuminating unit in the lighting apparatus according to the present invention;

Figure 16A:
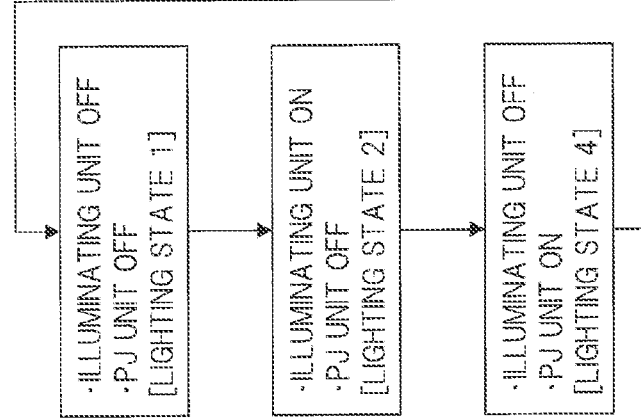
Figure 16B:
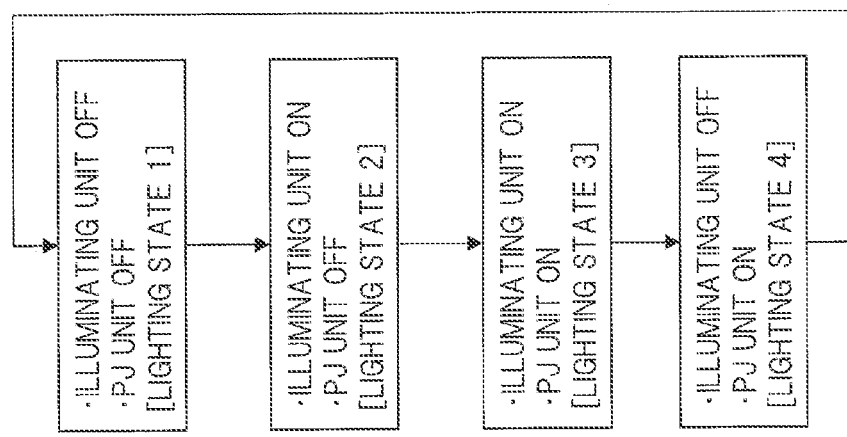
Figure 16C:
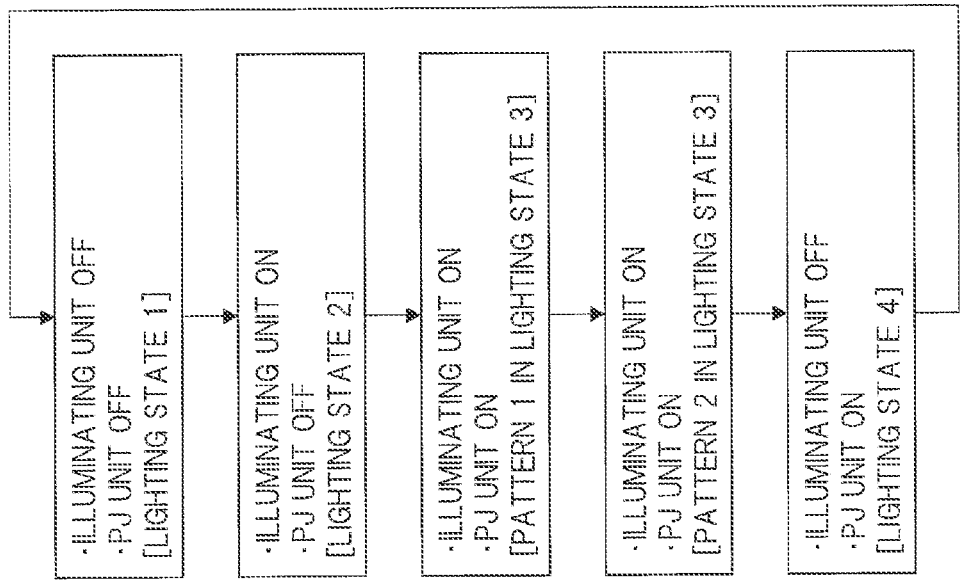
Figure 17C:
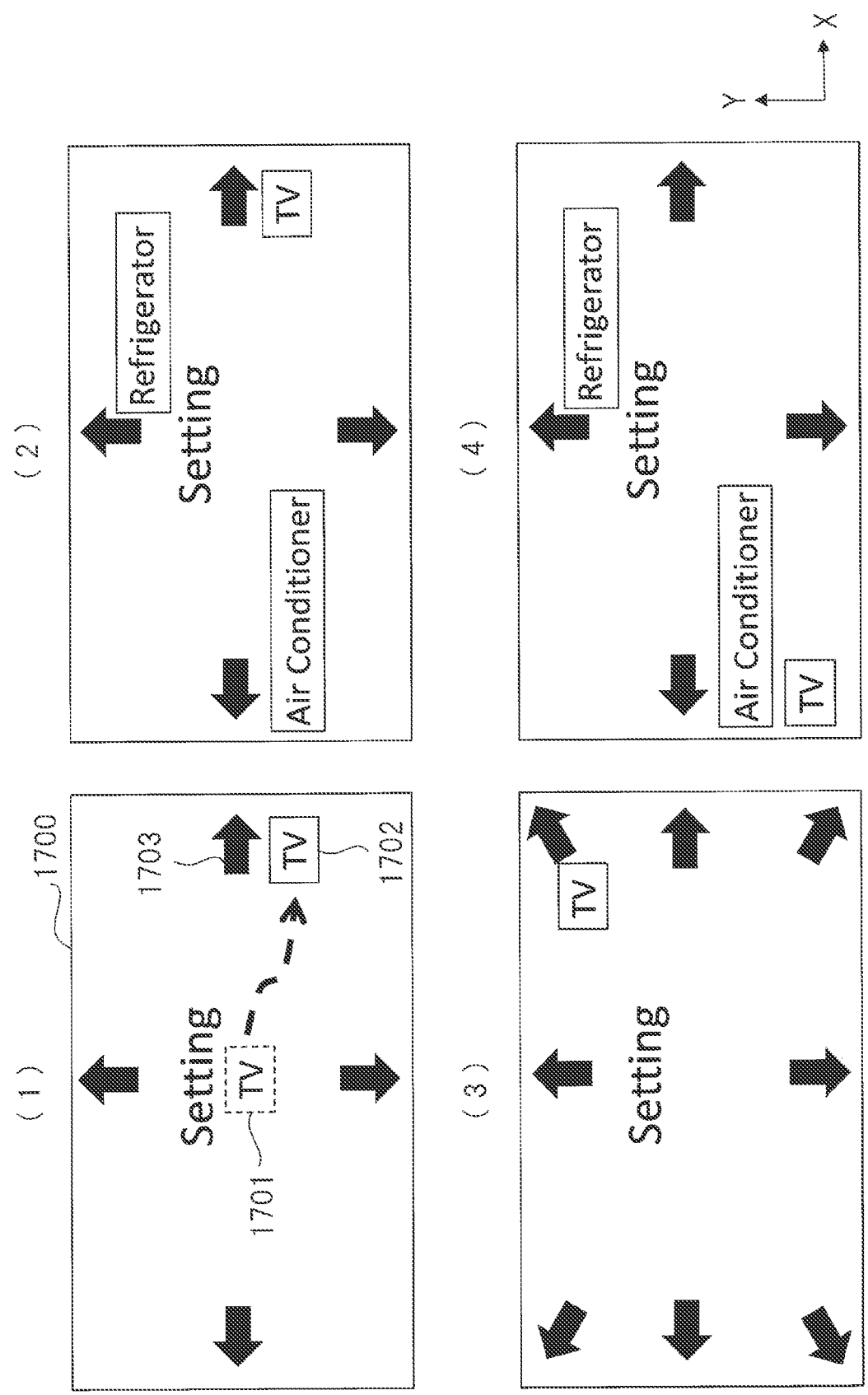

FIGS. 16(A)-16(C) are drawings for explaining examples of processings of changing, by a toggle-switching operation, image projection by the projector unit and lighting states of the illumination light source of the illuminating unit in the lighting apparatus according to the present invention;

FIG. 17A is a diagram for explaining an example of a configuration in which illumination light and an image are projected from the lighting apparatus according to the present invention onto a horizontal plane;

FIG. 17B comprises diagrams (1), (2), (3), and (4) which are examples of a setting screen displayed by a projected image of the lighting apparatus according to the present invention;

FIG. 17C comprises diagrams (1), (2), (3), and (4) which are examples of a setting screen displayed by a projected image of the lighting apparatus according to the present invention;

FIG. 17D comprises diagrams (1), (2), (3), and (4) which are examples of a display function using a projected image created by the lighting apparatus according to the present invention;

FIG. 17E comprises diagrams (1), (2), (3), and (4) which are examples of a setting screen and a display function that are displayed as a projected image created by the lighting apparatus according to the present invention;

FIG. 18A is a diagram for explaining an example of a configuration in which illumination light and an image are projected from the lighting apparatus according to the present invention onto a horizontal plane;

FIG. 18B comprises diagrams (1), (2), (3), and (4) which are diagrams for explaining error processing displayed as a projected image created by the lighting apparatus according to the present invention;

FIG. 18C is a diagram for explaining an example of a configuration in which illumination light and an image are projected from the lighting apparatus according to the present invention onto a horizontal plane;

FIG. 18D comprises diagrams (1), (2), (3), and (4) which are examples of a display screen of a display device capable of communicating with the lighting apparatus according to the present invention; and FIG. 19 comprises diagrams (1), (2), (3), and (4) which are diagrams for explaining error processing displayed as a projected image created by the lighting apparatus according to the present invention.

DETAILED DESCRIPTION OF PREFERRED EMBODIMENTS

Embodiments of the present invention will hereinafter be described in detail in reference to the accompanying drawings.

<Pendant-Type Lighting Apparatus with Image-Projecting Function and Ceiling-Type Lighting Apparatus with Image-Projecting Function>

Figure 1:
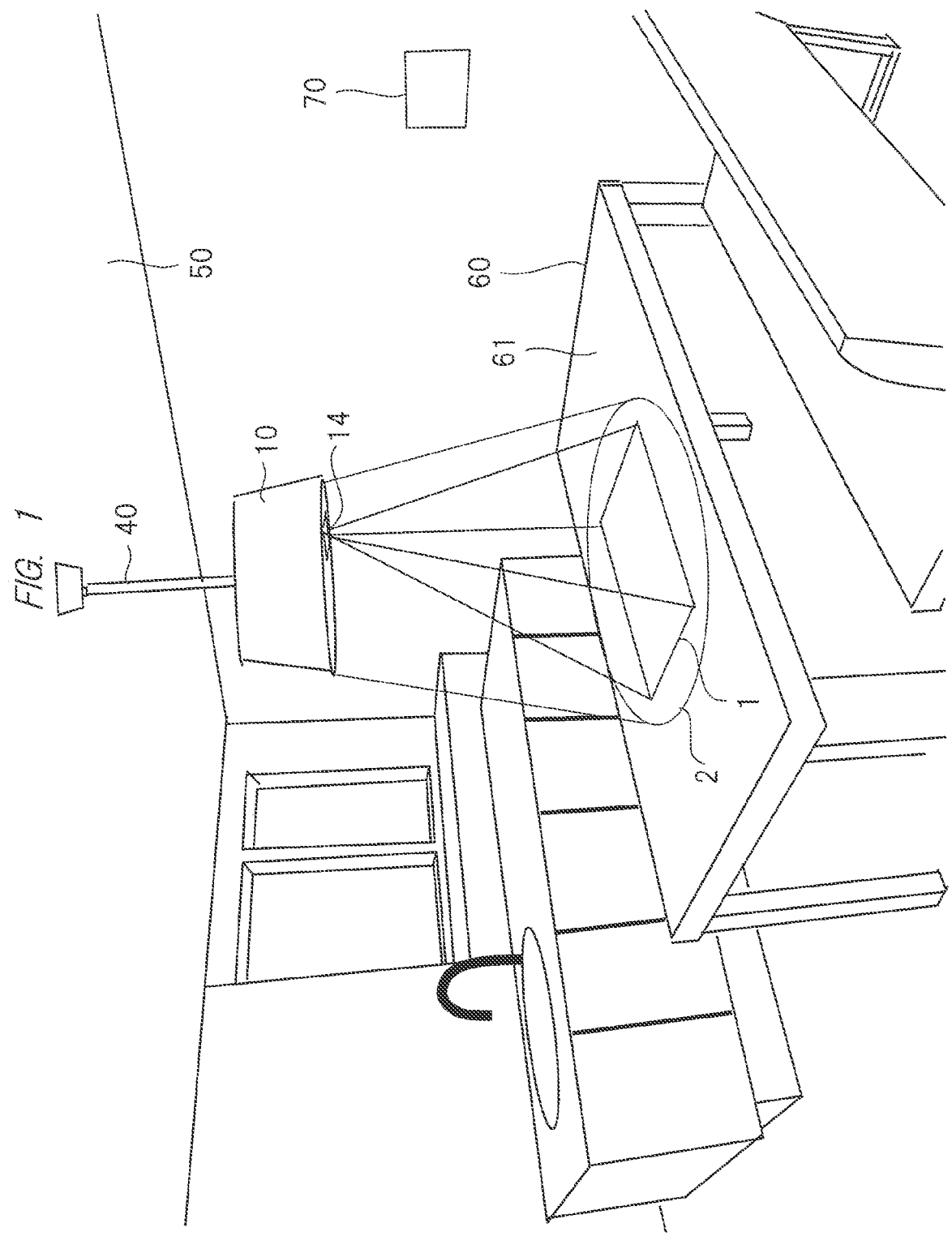
FIG. 1 is a perspective view showing an external configuration of a pendant-type lighting apparatus according to an embodiment of the present invention along with its service environment.
Figure 2:
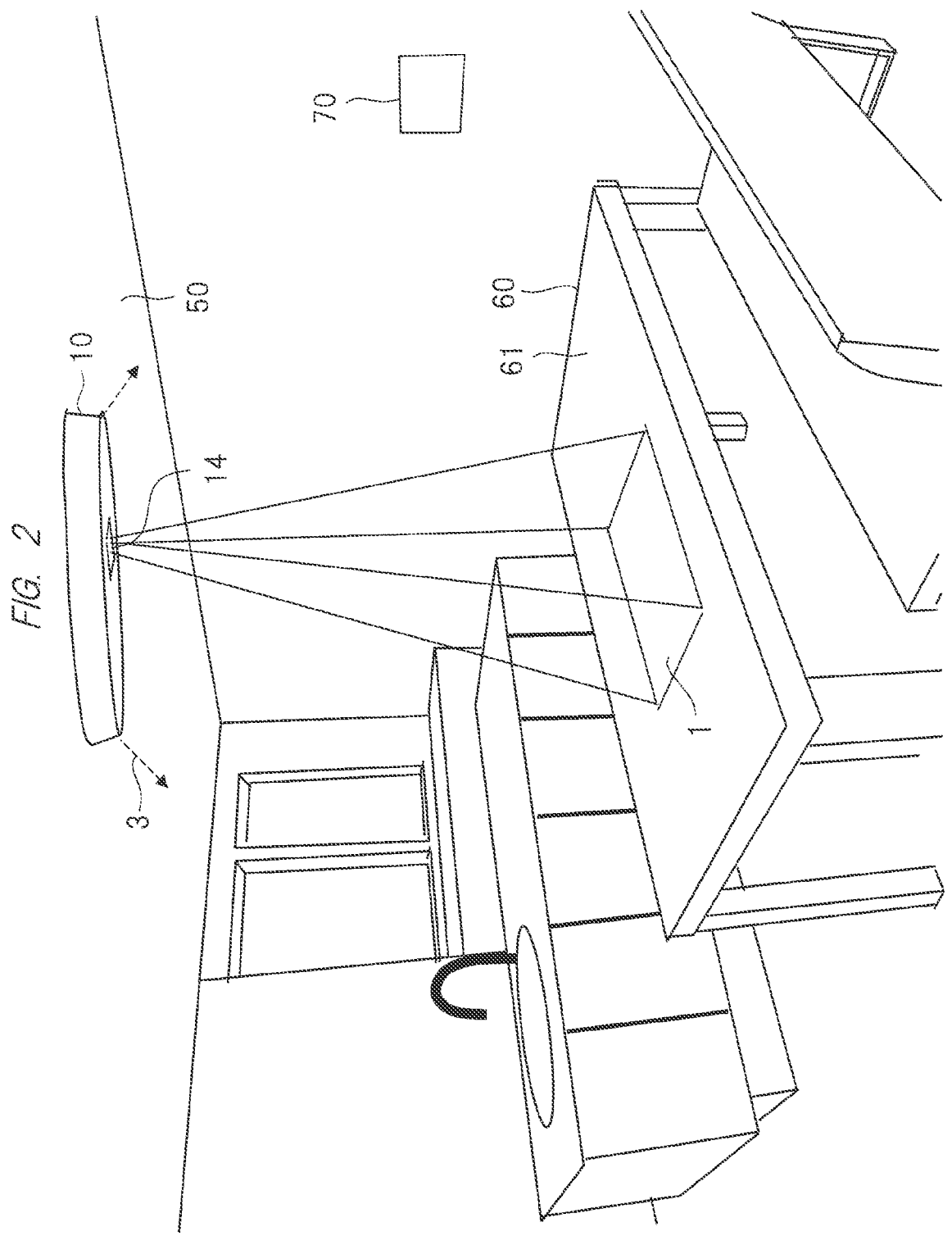
FIG. 2 is a perspective view showing an external configuration of a ceiling lighting apparatus according to an embodiment of the present invention along with its service environment.

FIGS. 1 and 2 of the accompanying drawings depict external configurations of lighting apparatuses with an image-projecting function according to one embodiment of the present invention. FIG. 1 shows a lighting apparatus with an image-projecting function, which is so-called a pendant-type lighting apparatus equipped with an image-projecting function, the pendant-type lighting apparatus being hung from a ceiling surface. FIG. 2 shows a lighting apparatus with an image-projecting function, which is so-called a ceiling-type lighting apparatus equipped with an image-projecting function, the ceiling lighting apparatus being mounted on the ceiling surface.

It is clearly understood from FIGS. 1 and 2 that each of these lighting apparatuses 10 with the image-projecting function is attached to, for example, a wall surface or ceiling surface 50 making up a space in a kitchen, dining room, living room, and office, etc., and is used thereon. More specifically, as shown in FIGS. 1 and 2, the lighting apparatus 10 is hung with a given height above a desk or table 60 located in a room across or is mounted integrally on the ceiling surface. The lighting apparatus 10 with the image-projecting function is a lighting apparatus that has both of an illuminating function of emitting illumination light 2 onto an upper surface of the desk or table, a wall surface, or the like, and an image-projecting function of projecting various images 1 onto the upper surface (display surface or projection surface) 61 of the desk or table 60 to display the images on the upper surface 61. Incidentally, reference numeral 40 in FIG. 1 shows a holder that holds the pendant-type lighting apparatus 10 hung at a desired location from the ceiling surface. An aperture or light-transmission window 14 will be described later.

A desk or table with a horizontal surface, on which an image is to be projected by the image-projecting function, is highly likely to be a target of illumination by the illumination function when the lighting apparatus 10 is used without exerting its image-projecting function. For this reason, it is preferable that an area in which the image 1 is projected by the image-projecting function and an illuminated range of illumination light 2 by the illuminating function overlap at least partially each other.

It is also preferable that the lighting apparatus with the image-projecting function includes various control units, which will be described later, so as to be able to switch ON/OFF about each of the illumination by the illumination function and the image projected by the image-projecting function.

Operation signals may be transmitted from an operation panel 70 (wall-mounted operation input unit) attached to a wall, etc., to the various control units of the lighting apparatus with the image-projecting function through wired or wireless communication to control switching-ON/OFF of the illumination light by the illumination function and the image projected by the image-projecting function.

Figure 3:
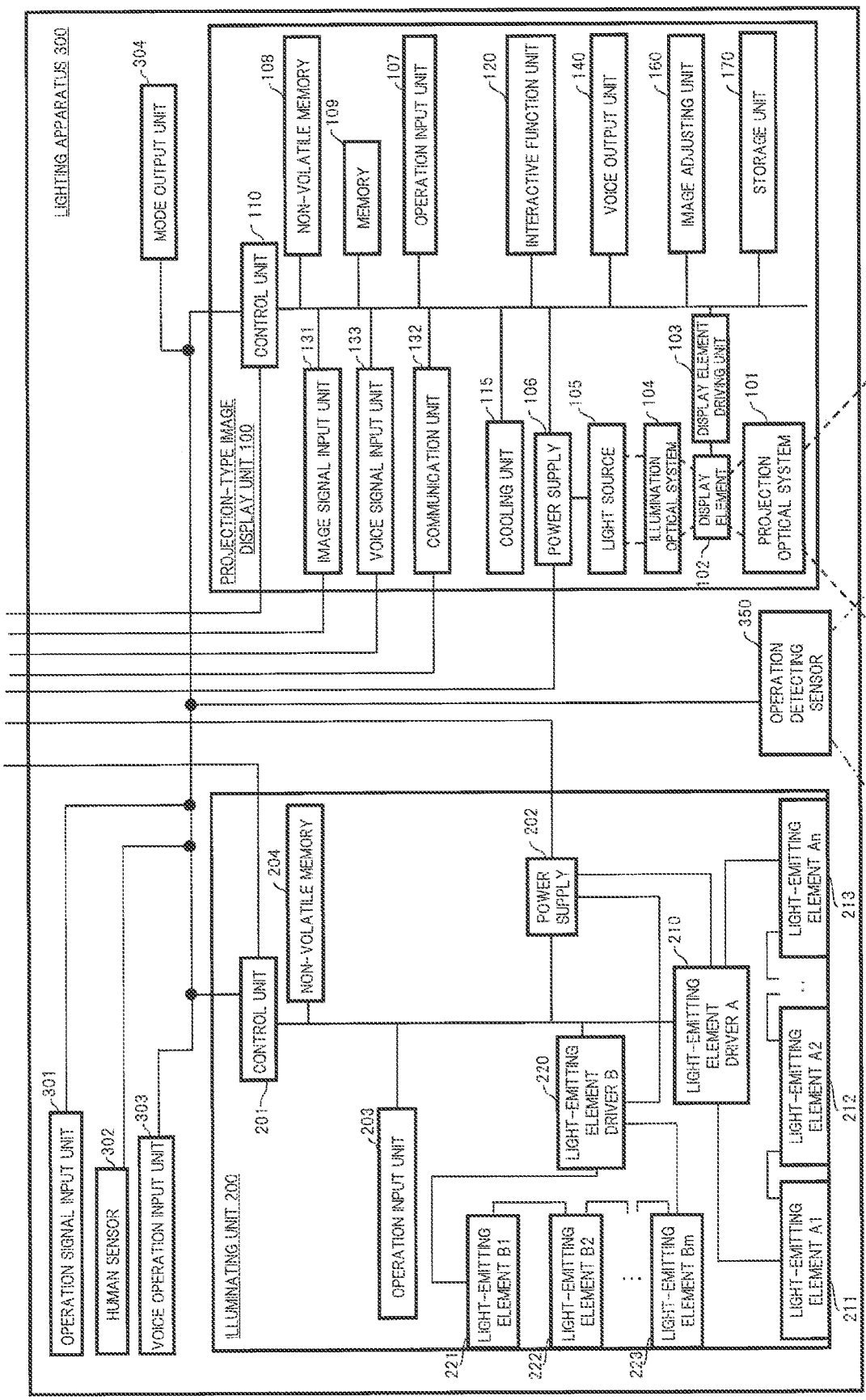
FIG. 3 is a block diagram of an example of an internal configuration of the lighting apparatus of the present invention.

FIG. 3 is a block diagram of an example of an internal configuration of a lighting apparatus 300 with an image-projecting function. The lighting apparatus 300 with the image-projecting function includes a projection-type image display unit 100 having an image-projecting function, and an illuminating unit 200 having an illumination light emitting function.

An operation signal input unit 301 is an operation button or a light-receiving portion of a remote controller. The operation signal input unit 301 receives an operation signal inputted by a user. A human sensor 302 is a sensor that determines the presence/absence of a human around the lighting apparatus 300 with the image-projecting function or in a room, in which the lighting apparatus 300 is placed, using infrared rays, ultrasonic waves, and visible light, etc. The human sensor 302 itself, unless otherwise specified in the following description, may be used as a human sensor fabricated by an existing technique. A voice operation input unit 303 collects voices around the lighting apparatus 300 with the image-projecting function, carries out a voice recognition processing, and converts a result of the voice recognition processing into an operation signal. An operation signal created by the voice operation input unit 303 is used for an operation by each unit making up the lighting apparatus 300 with the image-projecting function.

An operation detecting sensor 350 is a camera that captures an image in a range including an image projection area on a display surface 61. The operation detecting sensor 350 detects non-visible light, such as an infrared component, and thereby detects reflected light from an operated object. Incidentally, setting a cutoff wavelength of an optical filter of the operation detecting sensor 350 within a visible light wavelength range (e.g., within a red visible light range) allows the operation detecting sensor 350 to capture some visible light components other than infrared rays (i.e., projected image on the display surface) together with an infrared component. An input from the operation detecting sensor 350 is used for a processing of identifying a gesture made by a user's hand(s) near the image projection area.

A mode output unit 304 outputs or displays (1) alighting state in which the illumination light of the illuminating unit 200 is ON/OFF etc., (2) a stand-by mode in which the illumination light of the illuminating unit 200 is turned off, but the illumination unit 200 itself is in operation, (3) an error mode of the illuminating unit 200, (4) a lighting state in which the light source of the projection-type image display unit 100 is ON/OFF etc., (5) a stand-by mode in which the light source of the projection-type image display unit 100 is turned off, but the projection-type image display unit 100 itself is in operation, (6) an error mode of the projection-type image display unit 100, (7) an operation mode of the human sensor 302 (whether the human sensor 302 is in operation or not), (8) an operation mode of the voice operation input unit 303 (whether the voice operation input unit 303 is in operation or not), and (9) an operation mode of the operation detecting sensor 350 (whether the operation detecting sensor 350 is in operation or not).

The mode output unit 304 may be structured in such a way as to indicate a plurality of kinds of those modes by changing colors, and light emission frequencies, etc. of a plurality of LED indicators. The mode output unit 304 may also be structured in such a way as to indicate this plurality of kinds of modes in the form of characters, and marks, etc. on a liquid crystal monitor, an organic EL monitor, or other types of monitors.

Each of the above described operation signal input unit 301, human sensor 302, voice operation input unit 303, operation detecting sensor 350, and mode output unit 304 may be structured in such a way as to be capable of transmitting/receiving information to/from a control unit of the projection-type image display unit 100 and a control unit of the illuminating unit 200. This allows an input to the signal input unit 301, human sensor 302, voice operation input unit 303, operation detecting sensor 350, etc., to be used by the projection-type image display unit 100 and illuminating unit 200 for their respective processings. It also allows the mode output unit 304 to collectively indicate respective modes of the projection-type image display unit 100 and illuminating unit 200 on the same LED indicator or monitor.

A configuration of the projection-type image display unit 100 will then be described. The projection-type image display unit 100 is an optical system that projects an image onto the display surface 61, and includes a lens and/or a mirror. A display element 102 is an element that modulates light passing therethrough or reflected thereon to generate an image, and uses, for example, a transmissive liquid crystal panel, and reflective liquid crystal panel, DMD (Digital Micromirror Device: registered trademark) panel, etc. A display element driving unit 103 sends, to the display element 102, a drive signal corresponding to an image signal.

A light source 105 generates light for image projection, and uses a high-pressure mercury lamp, xenon lamp, LED light source, and laser light source, etc. A power supply 106 converts incoming external AC current into DC current to supply the light source 105 with DC current. The power supply 106 also supplies each of other units with necessary DC current.

An illumination optical system 104 condenses light generated by the light source 105 into a uniform beam of light and emits it onto the display element 102. A cooling unit 115 cools a unit that comes to have a high temperature, such as the lighting source 105, power supply 106, and display element 102, by an air-cooling method or liquid-cooling method as the need arises. An operation signal input unit 107 is an operation button or a light-receiving unit of a remote controller. The operation signal input unit 107 receives an operation signal inputted by a user. The operation signal input unit 107 may receive an infrared signal, and radio signal, etc. from the operation panel 70 of FIG. 1. When a signal from the operation signal input unit 301 of the lighting apparatus 300 is inputted to the projection-type image display unit 100, the projection-type image display unit 100 may dispense with operation signal input unit 107.

An image signal input unit 131 is connected to an external image output device and receives image data inputted from the image output device. A voice signal input unit 133 is connected to an external voice output device and receives voice data inputted from the voice output device. A voice output device 140 can perform a voice output based on voice data inputted to the voice signal input unit 133. The voice output device 140 may output an operation sound or error alarm sound stored therein. A communication unit 132 is connected to, for example, an external information processor and inputs/outputs various control signals. The communication unit 132 may carry out wired or wireless communication with the operation panel 70 of FIG. 1.

A non-volatile memory 108 stores various data used for the projector function. Data stored in the non-volatile memory 108 includes data of various kinds of operations carried out by an interactive function that will be described later, display icon data, and calibration data that will be described later. A memory 109 stores data of an image to be projected, and data for controlling the apparatus. A control unit 110 controls the operation of each of units connected to the control unit 110. The control unit 110 may input/output information from/to the operation signal input unit 301, human sensor 302, voice operation input unit 303, and operation detecting sensor 350, etc. to control them.

An interactive function unit 120 is a unit that executes an interactive action, such as the user's manipulating a light-emitting pen or finger, for writing a character and figure, etc. in an image area. To execute the interactive action, the interactive function unit 120 has: a function of analyzing an infrared image acquired from the operation detecting sensor 350 to calculate the position of the light-emitting pen or finger (position at which the user manipulates the pen or finger); and a function of executing application programs capable of being manipulated by the light-emitting pen or finger such as an application program for synthesizing an operation icon in a projected image or carrying out a graphic processing, etc. based on the user's operation and an application program for handling an image, etc., inputted by an external image output device.

It is hardly conceivable that the image-capturing range of the operation detecting sensor 350 matches a range of an image projected on the display surface 61 (optical image on the display surface 61 in the image area of the display element 102). For this reason, when the location of an operation (drawing) by the user is calculated, coordinates in the image-capturing range of the operation detecting sensor 350 must be transformed into coordinates of the image projected on the display surface 61. The interactive function unit 120, therefore, has a function of carrying out a processing of the transformation and a processing of creating transformation table data (calibration data) for the transformation processing.

An image adjusting unit 160 carries out an image processing to image data inputted by the image signal input unit 131. The image processing includes, for example, a scaling processing of magnifying, demagnifying, or deforming an image, a brightness adjusting processing of changing brightness, a contrast adjusting processing of changing the contrast curve of an image, and a retinex processing of decomposing an image into optical components and changing the amount of weighting of each component.

A storage unit 170 stores pictures, images, voices, and various data. For example, the storage unit 170 may store pictures, images, voices, and various data in advance when the apparatus is shipped as a product, and may store pictures, images, voices, and various data that are acquired from an external device, and server, etc. through the communication unit 132. Pictures, images, and various data, etc. stored in the storage unit 170 may be outputted as projected images through the display element 102 and projection optical system 101. A voice recorded in the storage unit 170 may be outputted as a voice message from the voice output unit 140.

As described above, the projection-type image display unit 100 may be equipped with various functions. The projection-type image display unit 100, however, does not always need to have all of the above functions. The projection-type image display unit 100 may have any configuration on the condition that it has the function of projecting an image.

A configuration of the illuminating unit 200 will then be described.

A control unit 201 controls each of units connected to the control unit 201. The control unit 201 may input/output information from/to the operation signal input unit 301, human sensor 302, voice operation input unit 303, and operation detecting sensor 350, etc. to control them. An operation signal input unit 203 is an operation button or a light-receiving unit of a remote controller. The operation signal input unit 203 receives an operation signal inputted by the user. The operation signal input unit 203 may receive an infrared signal, or radio signal, etc. from the operation panel 70 of FIG. 1. When a signal from the operation signal input unit 301 of the lighting apparatus 300 is inputted to the illuminating unit 200, the illuminating unit 200 may dispense with operation signal input unit 203. A non-volatile memory 204 stores various data used by the illuminating unit 200.

A power supply 202 converts incoming external AC current into DC current to supply light-emitting element drivers (210 and 220, etc.) with the DC current. The power supply 202 also supplies other units with necessary DC current. The light-emitting element drivers (210 and 220, etc.) use current supplied from the power supply 202 to cause light-emitting elements (211, 212, 213, 221, 222, and 223, etc.) to emit light based on control by the control unit 201. These light-emitting elements serve as a light source(s) for illumination light emitted by the illuminating unit 200.

For example, in the example of FIG. 3, the light-emitting element driver A 210 collectively drives n light-emitting elements A1 211, A2 212, . . . , An (211, 212 and 213, etc.) that are connected in series. Based on control by the control unit 201, the light-emitting element driver A 210 changes the brightness and colors of these light-emitting elements. In the same manner, the light-emitting element driver B 220 collectively drives m light-emitting elements B1, B2, . . . , Bn (221, 222 and 223, etc.) that are connected in series. Based on control by the control unit 201, the light-emitting element driver B 220 changes the brightness and colors of these light-emitting elements. Therefore, this configuration can control changes in the brightness and colors of the light-emitting elements for each of light-emitting element drivers. The example of FIG. 3 indicates two sets of the light-emitting element driver and the plurality of light-emitting elements. One set or three or more sets of the same are also possible. The number of sets of the light-emitting element driver and the plurality of light-emitting elements may be increased or decreased as the need arises.

According to the configuration as described above, the illuminating unit 200 can emit illumination light that is variable in brightness and/or color.

Then, described will be layouts of an optical unit, which includes the projection optical system 101, display element 102, illumination optical system 104, and light source 105, etc. of the projection-type image display unit 100, and the light-emitting elements (211 and 221, etc.) which serve as the light source of the illuminating unit 200.

<Definition of Layouts of Projector Optical Unit>

This specification defines layouts of an optical unit (30) making up a projector in the following manner.

<Vertical Placement Position of Optical Unit>

Figure 4:
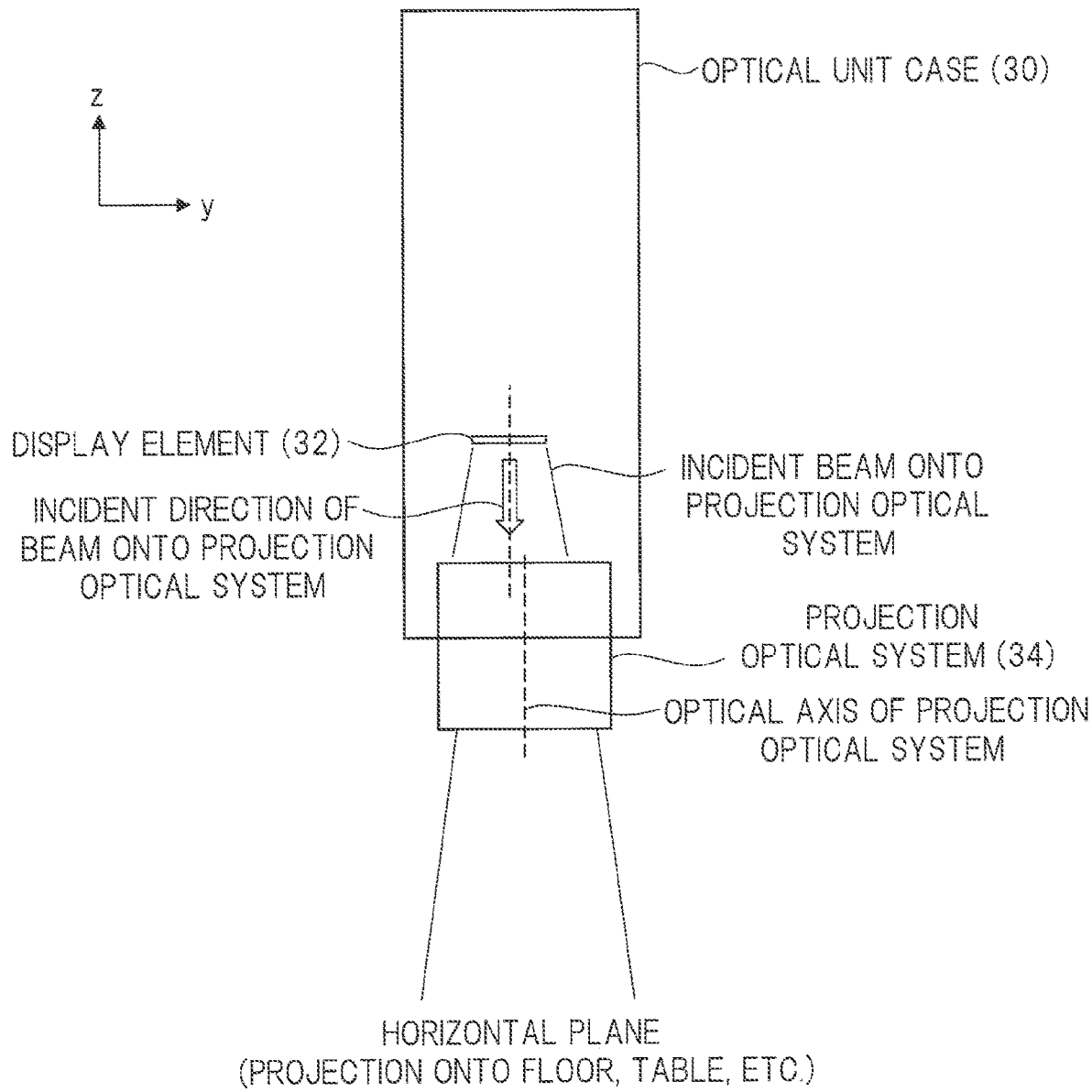
FIG. 4 is a side view for defining a vertical placement position at which an optical unit in the lighting apparatus according to the present invention is set.
Figure 5:
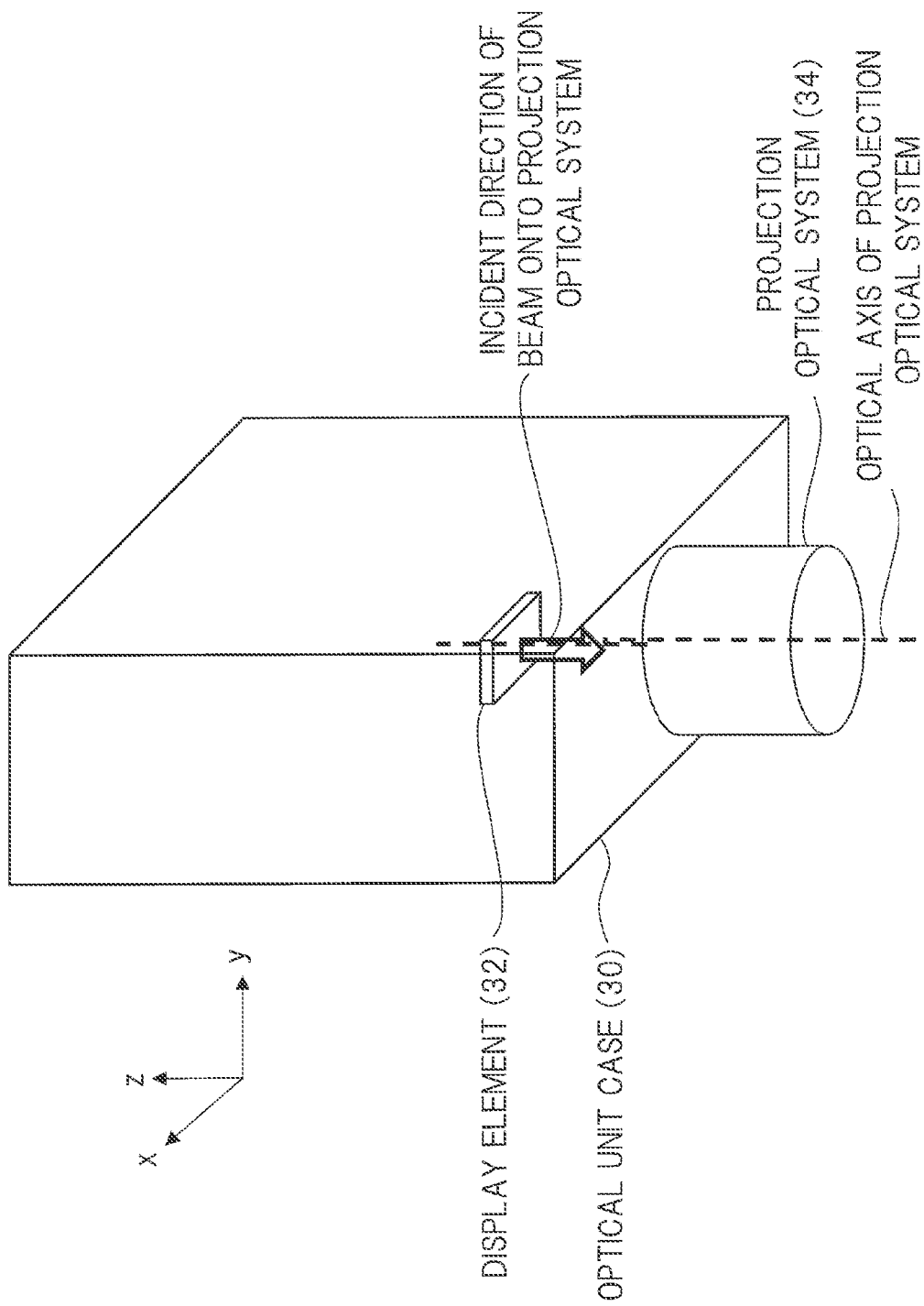
FIG. 5 is a perspective view for defining the vertical placement position at which the optical unit in the lighting apparatus according to the present invention is set.

A vertical placement position of the optical unit means a state in which, as shown in FIGS. 4 and 5, when a beam from a display element 32 (corresponding to the reference numeral 102 of FIG. 3) making up the projector is incident, for example, on a so-called projection optical system 34 (corresponding to the reference numeral 101 of FIG. 3) including various optical elements such as a lens, an incident direction of the beam or an optical axis of the projection optical system 34, on which the beam is incident, is arranged in a direction substantially perpendicular to a horizontal plane (which is perpendicular to a sheet surface on which Figure is drawn) or arranged in a direction closer to a vertical direction to the horizontal plane than a parallel direction to the horizontal plane. Incidentally, in FIGS. 4 and 5, a z direction is the vertical direction, i.e., the direction perpendicular to the horizontal plane.

According to this layout, light projected from the projection optical system 34 can form an optical image of the beam generated by the display element 32 on the horizontal plane. Various layouts are in optical systems from a light source (corresponding to the reference numeral 105 of FIG. 3) to the display element 32 although not illustrated. For example, as one example, there is a transmissive or reflective element as the display element 32. Various optical systems such as a single element or a plurality of elements are known as the display element 32. However, in an attempt to miniaturize an optical unit case by its vertical placement position shown in FIGS. 4 and 5, reducing a size of the optical unit in the z direction of FIGS. 4 and 5 is not easy when the layout of the display element 32 and projection optical system 34 is taken into consideration.

The optical unit 30 in its vertical placement position can be reduced in size more easily in its y direction than in other directions. When an attempt to miniaturize the optical unit case in its vertical placement position is made, therefore, an optical unit reduced in size to a greater extent in the y direction than in the z direction is formed as shown in a perspective view of FIG. 5.

Incidentally, as indicated by broken lines in FIGS. 4 and 5, by changing the setting of a relative position between a central position of the display element 32 and an optical axis of the projection optical system 34 on the x-y plane, the position of the optical image by the display element on the horizontal plane can be changed. In this manner, the position of the projected image on the horizontal plane can be freely set as the need arises.

<Horizontal Placement Position of Optical Unit>

Figure 6:
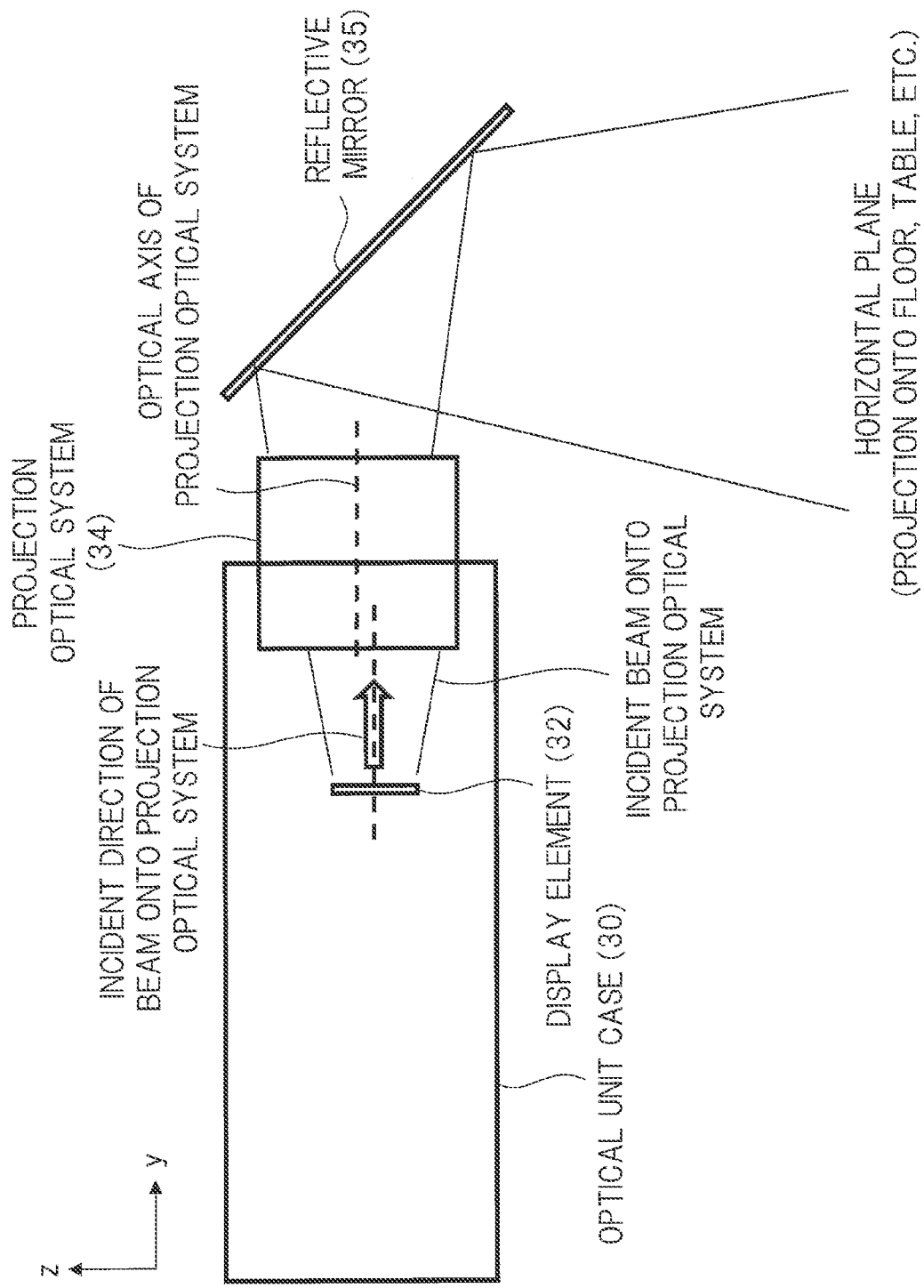
FIG. 6 is a side view for defining a horizontal placement position at which the optical unit in the lighting apparatus according to the present invention is set.
Figure 7:
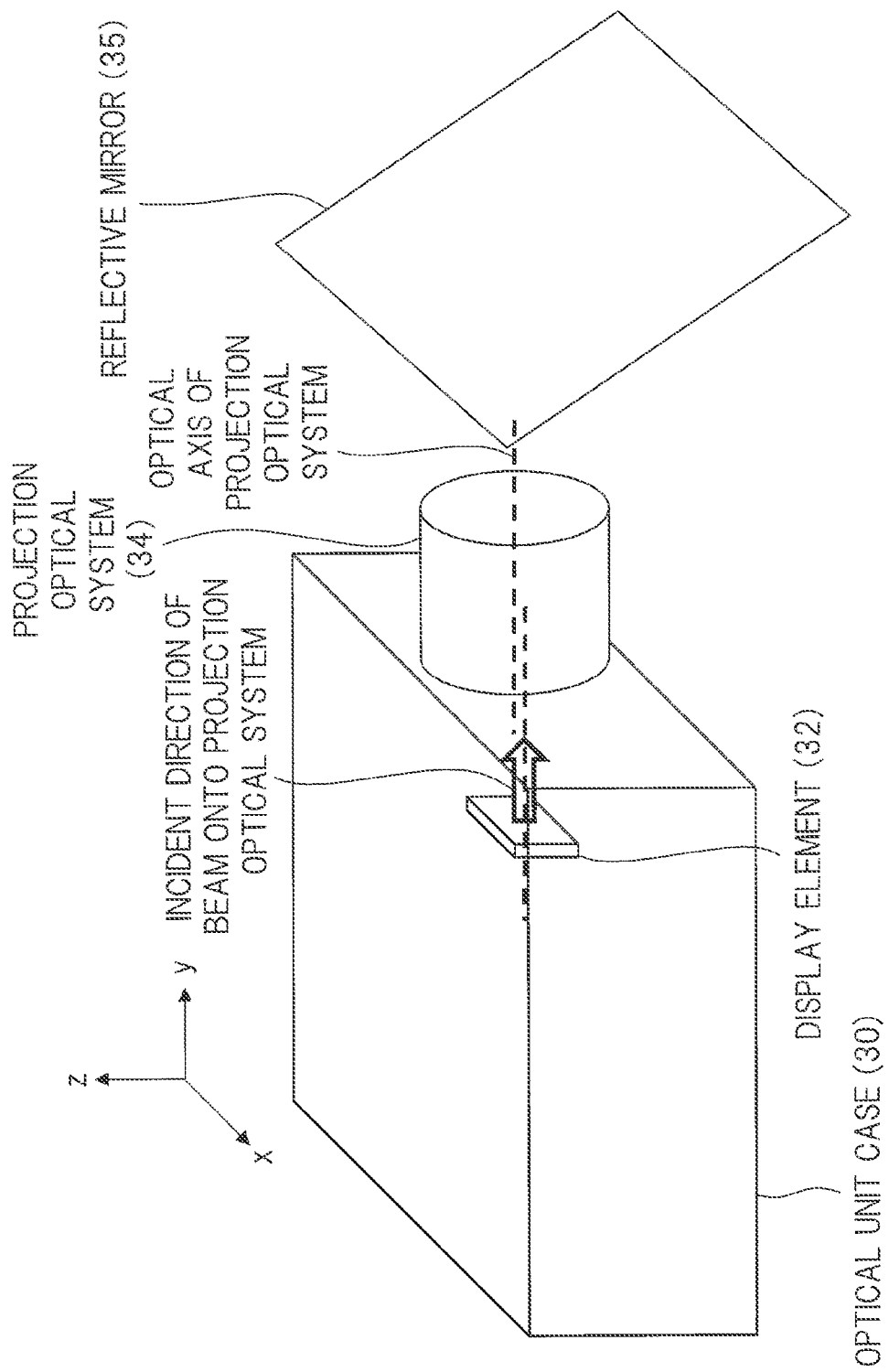
FIG. 7 is a perspective view for defining the horizontal placement position at which the optical unit in the lighting apparatus according to the present invention is set.

A horizontal placement position of the optical unit means a state in which, as shown in FIGS. 6 and 7, when a beam from the display element 32 (corresponding to the reference numeral 102 of FIG. 3) making up the projector is incident, for example, on a so-called projection optical system 34 (corresponding to the reference numeral 101 of FIG. 3) including various optical elements, such as a lens, the incident direction of the beam or the optical axis of the projection optical system 34, on which the beam is incident, is arranged in a direction substantially parallel with the horizontal plane or arranged in a direction closer to the parallel direction to the horizontal plane than the vertical direction. Incidentally, in FIGS. 6 and 7, the z direction is the vertical direction, i.e., the direction perpendicular to the horizontal plane.

According to this layout, the beam from the projection optical system 34 is reflected by a reflective mirror 35, etc., to form an optical image of the display element 32 on the horizontal plane. Various layouts are in optical systems from the light source (corresponding to the reference numeral 105 of FIG. 3) to the display element 32 although not illustrated. For example, as one example, there is a transmissive or reflective element as the display element 32. Various optical systems such as a single element or a plurality of elements are known as the display eminent 32. However, in attempting to miniaturize the optical unit case in its horizontal placement position shown in FIGS. 6 and 7, reducing the size of the optical unit in the y direction of FIGS. 6 and 7 is not easy when the layout of the display element 32 and projection optical system 34 is taken into consideration.

However, the optical unit 30 in its horizontal placement position can be reduced in size more easily in its z direction than other directions. When an attempt to miniaturize the optical unit case in its horizontal placement position is made, therefore, an optical unit reduced in size to a greater extent in the z direction than in the y direction is formed as shown in a perspective view of FIG. 7.

Incidentally, as indicated by broken lines in FIGS. 6 and 7, by changing the setting of the relative position between the central position of the display element 32 and the optical axis of the projection optical system 34 on the x-z plane, the position of the optical image by the display element on the horizontal plane can be changed. In this manner, the position of the projected image on the horizontal plane after reflection by the beam reflected by the reflective mirror 35 can be set freely in its design as the need arises.

Incidentally, in the example of FIGS. 6 and 7, a reflective optical element such as the reflective mirror 35 is disposed at a rear stage to the projection optical system. The reflective optical element, however, may be disposed between optical elements such as a plurality of lenses making up the projection optical system.

Incidentally, in the example of FIGS. 6 and 7, the reflective mirror 35 may be regarded as an element separated from the optical unit or as an element included in a part of the optical unit.

Specific layouts (arrangements) of the optical unit 30 and illumination light source of the lighting apparatus with the image-projecting function will hereinafter be described in reference to FIGS. 8 to 13. Incidentally, in FIGS. 8 to 13, a plurality of semiconductor light-emitting elements (LED) 22 correspond to the light-emitting elements (211, 212, 213, 221, 222, and 223, etc.) of FIG. 3. The entire illumination light source, which includes a set of the plurality of semiconductor light-emitting elements (LED) 22, is described as an illumination light source 20.

Incidentally, in each of FIGS. 8 to 13, dotted lines in a side view show a range of diffusion of illumination light from the illuminating unit 200, and a triangle area spreading from the optical unit 30 represents, from its side surface, an area of projection of an image projected from the optical unit 30 of the projection-type image display unit 100.

Incidentally, FIGS. 8 to 13 also show, in addition thereto, examples in which a drawstring-type toggle switch as described later in FIG. 14 is attached to the lighting apparatus. In each of Figures, a drawstring portion 90 (which may be formed by a fiber string, metal chain, or synthetic resin chain, etc.) of the drawstring-type toggle switch and a front end of the drawstring portion 90 are shown. When the drawstring toggle switch is attached to the lighting apparatus, the drawstring-type toggle switch should preferably have such a layout that, as shown in each of FIGS. 8 to 13, the front end 91 is within the range of diffusion of illumination light from the illuminating unit 200 and is outside the area of projection of the image projected from the optical unit 30 of the projection-type image display unit 100. Attaching the drawstring-type toggle switch in a lower direction of the casing (shade) 11 allows miniaturization of the lighting apparatus with the image-projecting function. Therefore, the drawstring portion 90 and front end 91 of the drawstring-type toggle switch are located within the range of diffusion of illumination light from the illuminating unit 200.

At this time, as shown in FIGS. 8 to 13, when the plurality of semiconductor light-emitting elements are used as the light source for illumination light from the illuminating unit 200, the drawstring portion 90 and front end 91 of the drawstring-type toggle switch are illustrated by beams of light coming in a plurality of directions. As a result, shadows that are created by the drawstring portion 90 and front end 91 of the drawstring-type toggle switch relative to the light source for illumination light from the illuminating unit 200 are thinned by a plurality of incoming beams of light with different incident angles and, consequently, become less noticeable. A problem is, therefore, difficult to cause in quality. Meanwhile, any image-projecting light from the optical unit 30 comes out of an outgoing port of the optical unit 30. If the drawstring portion 90 and front end 91 of the drawstring-type toggle switch are present in the area of projection of the image projected from the optical unit 30, therefore, shadow portions created by the drawstring portion 90 and front end 91 of the drawstring-type toggle switch over the projected image bring a lack of the image, and its quality becomes very poor.

When the drawstring-type toggle switch is attached to the lighting apparatus with the image-projecting function, therefore, the drawstring-type toggle switch preferably have such a layout that, as shown in each of Figures, the front end 91 is within the range of diffusion of the illumination light from the illuminating unit 200 and is outside the area of projection of the image projected from the optical unit 30 of the projection-type image display unit 100.

<Pendant-Type Lighting Apparatus with Image-Projecting Function>

Figure 8A:
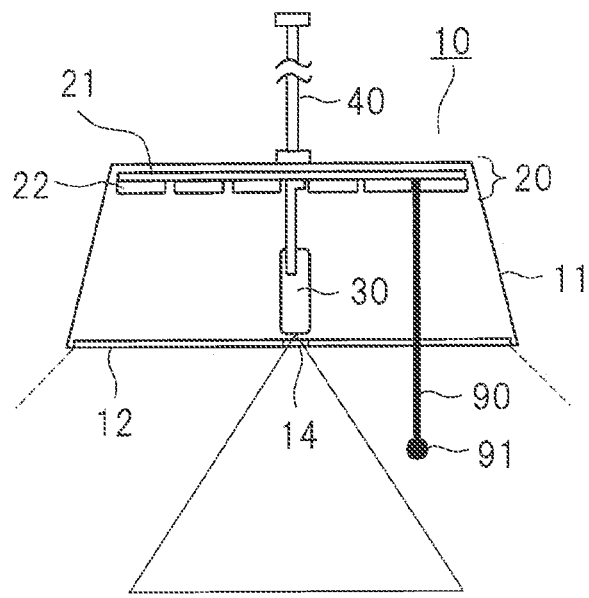
FIG. 8(A) is a side view and FIG. 8(B) is a bottom view for explaining an example of layout (arrangement) of the optical unit and an illumination light source in a casing of the lighting apparatus according to the present invention.
Figure 8B:
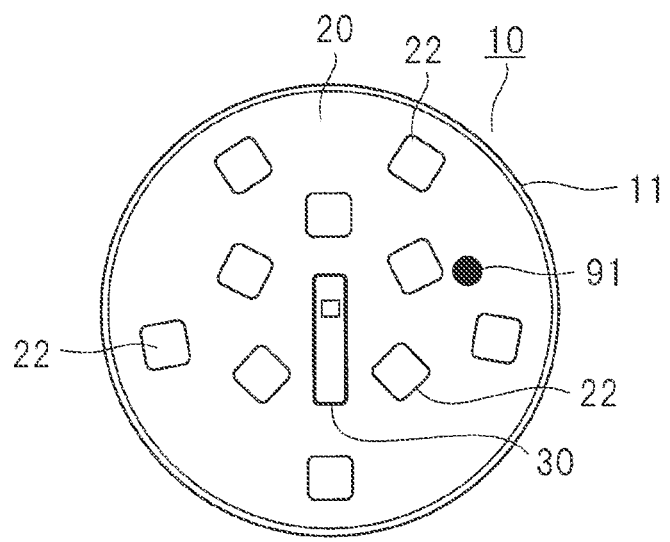

FIG. 8(A) is a side sectional view of a pendant-type lighting apparatus 10 with the image-projecting function, and FIG. 8(B) is a bottom view of the same. In this example, the optical unit 30 is positioned at the vertical placement layout. Attached to an interior bottom surface of the casing (shade) 11, which is a body of the lighting apparatus, is a board 21 for the illuminating light source 20, which has the plurality of semiconductor light-emitting elements (LED) 22. Attached to an opening surface on a lower side of the casing (shade) 11 of Figure is a diffusing panel 12 so as to cover it.

In a space formed by the casing (shade) 11 and the diffusing panel 12, the optical unit 30 is placed so that it is located substantially at a center of illumination beams. In the example of FIG. 8, provided in the diffusing panel 12 is an aperture or light-transmission window 14 formed at a position at which the optical unit 30 emits projection light downward. This is because if the diffusing panel 12 has no aperture or light-transmission window and exerts a diffusion effect across its entire surface, it results in diffusion of an image projected from the optical unit 30, in which case no image is formed on an image projection surface such as a surface of a desk or table.

The aperture or light-transmission window 14 may be an opening cut out of the diffusing panel 12 or may be a portion made of a transmissive material such as glass having no diffusion effect. The light-transmission window made of a transmissive material, etc., may be given a structure that is difficult to pass dust etc. into the diffusing panel 12. To avoid affecting the image projected from the optical unit 30 as much as possible, the light-transmission window should be subjected to a coating having spectral characteristics as flat as possible in a wavelength range of projection light emitted from the optical unit 30.

Incidentally, a periphery of the aperture or light-transmission window 14 needs not be connected directly to the diffusing panel 12. To make a shadow of the optical unit 30 over the diffusing panel 12 less noticeable, an area for a decorative panel etc. may be provided between the aperture or light-transmission window 14 and the diffusing panel 12. That is, the aperture or light-transmission window 14 is a light-passage port or light-transmission port necessary for emitting image-projecting light from the optical unit 30 placed in a space formed by the casing (shade) 11 and the diffusing panel 12, and its location may be in the diffusing panel 12 or a part of another structure.

According to such a layout (arrangement), the optical unit 30 can be reduced in size in the direction parallel with the horizontal plane, and so a ratio of a shadow formed by the optical unit 30 to an area of illumination light from the illumination light source 20 to the diffusing panel 12 can be reduced. This makes it possible to suppress the degradation of the quality apparently viewed as the lighting apparatus due to an influence to the shadow of the optical unit 30 formed over the diffusion plate 12 (i.e., a sense of incongruity as the lighting apparatus due to the shadow over the diffusing panel 12). Even if the casing (shade) 11 is formed in the diffusing panel, the shadow of the optical unit 30 is made less noticeable, thus making it possible to suppress the degradation of the quality apparently viewed as the lighting apparatus.

Figure 9A:
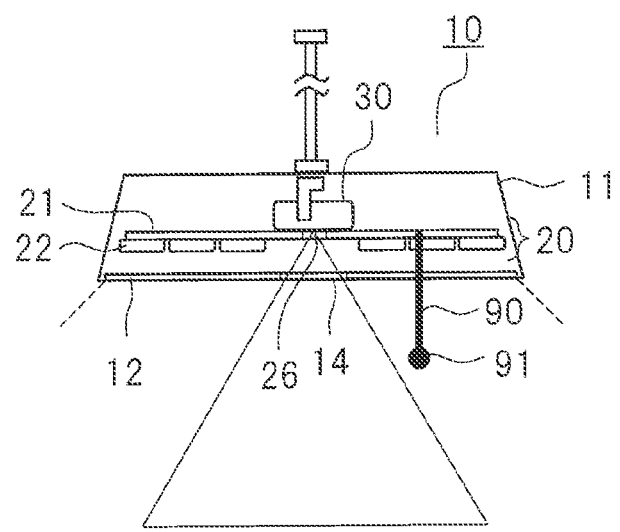
FIG. 9(A) is a side view and FIG. 9(B) is a bottom view for explaining an example of layout (arrangement) of the optical unit and the illumination light source in the casing of the lighting apparatus according to the present invention.
Figure 9B:
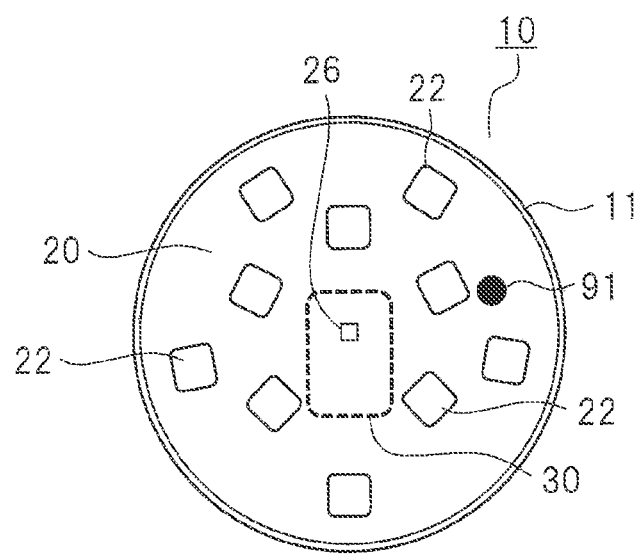

In an example of FIGS. 9(A) and 9(B), the optical unit 30 is positioned at a horizontal placement layout. In this example, the optical unit 30 is located above the board 21 for the illuminating light source 20, and may be mounted, for example, on an upper surface of the board 21 or attached to the casing (shade) 11. The lighting apparatus with the image-projecting function as a whole is further reduced in size in the vertical direction, and therefore the lighting apparatus with the image-projecting function having a thinner structure can be achieved. Incidentally, in this modification, an aperture or light-transmission window for transmitting image-projecting light from the optical unit 30 is formed on the diffusing panel 12 attached so as to cover the opening below the illuminating light source 20, and becomes larger in size than the above aperture or light-transmission window. On a part of the diffusing panel 12, that is, at a part on which the optical unit 30 is mounted, an aperture (or light-transmission window) 26 for transmitting light projected from the optical unit 30 is formed.

In such a configuration, the lighting apparatus with the image-projecting function having a thinner structure can be achieved, and the optical unit 30 is located at a rear side of the board 21 relative to the illumination range, and therefore the optical unit 30 blocks the illumination light from the illumination light source 20 to create no shadow. This prevents the degradation of the quality apparently viewed as the lighting apparatus (i.e., a sense of incongruity as the lighting apparatus due to the shadow over the diffusing panel 12).

At this time, by setting the lower surface of the optical unit 30 substantially in contact with the upper surface of the board 21, the size of the aperture (or light-transmission window) 26 of the board 21 can be reduced as much as possible. This allows the plurality of semi-conductor light-emitting elements (LED) 22 to be arranged more efficiently on the board 21.

Figure 10A:
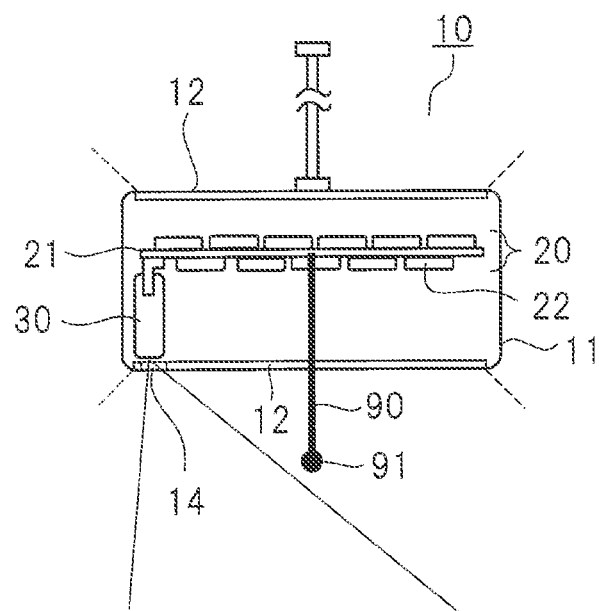
FIG. 10(A) is a side view and FIG. 10(B) is a bottom view for explaining an example of layout (arrangement) of the optical unit and the illumination light source in the casing of the lighting apparatus according to the present invention.
Figure 10B:
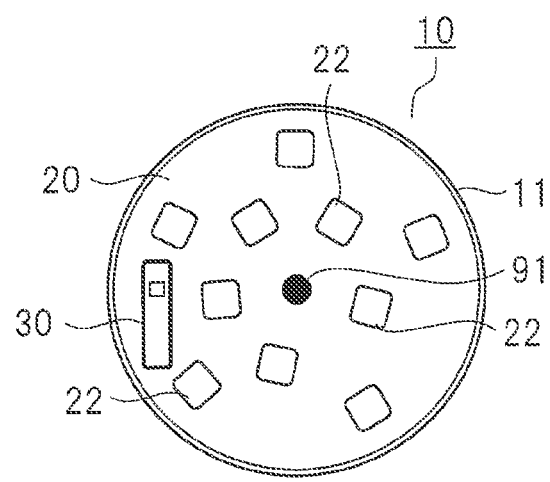

FIG. 10(A) is a side sectional view of the pendant-type lighting apparatus 10 with the image-projecting function, and FIG. 10(B) is a bottom view of the same. In this example, the optical unit 30 is positioned at a vertical placement layout. The optical unit 30 is attached inside the casing (shade) 11 is arranged so as to be located at an end of illumination beams.

In this layout (arrangement), the optical unit 30 is arranged so as to be located at the end of illumination beams, and the optical axis of the projection optical system and the center of the display element in the optical unit 30 are relatively shifted in position horizontally to each other. Therefore, an image is projected so that its center is brought closer to the center of illumination beams from the illumination light source 20 relative to the outgoing port of the projection optical system of the projector.

The arrangement of FIG. 10 allows a so-called stationary-type projector, which is usually placed on a table and is used there, to be used as the projector of the lighting apparatus as it is. This is because, in many stationary-type projectors, the optical axis of the projection optical system and the center of the display element are already set with them shifted in position relative to each other. The lighting apparatus with the image-projecting function of FIG. 10 thus has a structure suitable for cost reduction. This cost reduction effect is achieved also in other configuration examples in which the optical unit 30 is located at the end of downward illumination beams.

In the layout of FIGS. 10(A) and 10(B), the plurality of semiconductor light-emitting elements (LED) 22 are arranged so as to be mounted on both surfaces of the board 21 for the illumination light source 20. This allows the illumination light to be emitted not only in the downward direction but also in the upward direction. According to such a configuration, the lighting apparatus 10 with the image-projecting function can emit illumination light upward, thus functioning also as an indirect illumination (ceiling-side indirect illumination function) since being able to illuminate a ceiling etc. in upward illumination light. Incidentally, in this example, in addition to the diffusing panel 12 (lower diffusing panel) covering the opening surface on the lower surface of the casing (shade) 11, another diffusing panel 12 (upper diffusing panel) is attached so as to cover an opening surface on the upper surface of the casing (shade) 11.

Such a configuration having an illumination function of emitting the illumination light in a plurality of different directions and an image-projecting function allows switching of a plurality of combination modes of the illumination light emission and the image-projecting light projection. For example, control may be performed to switch a mode in which only the image-projecting light is projected downward, a mode in which illumination light is emitted downward while the image-projecting light is not projected, a mode in which the illumination light is emitted upward while the image-projecting light is not projected, and in a mode in which the illumination light is emitted upward while the image-projecting light is projected downward.

Incidentally, in FIG. 10, the optical unit 30 is located at the end of beams of downward illumination light, but the optical unit 30 may be located at a central portion etc. of beams of downward illumination light.

Figure 11A:
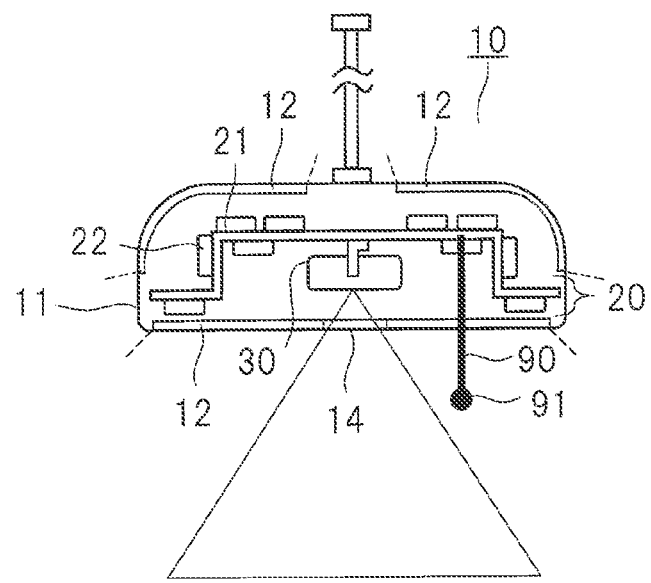
FIG. 11(A) is a side view and FIG. 11(B) is a bottom view for explaining an example of layout (arrangement) of the optical unit and the illumination light source in the casing of the lighting apparatus according to the present invention.
Figure 11B:
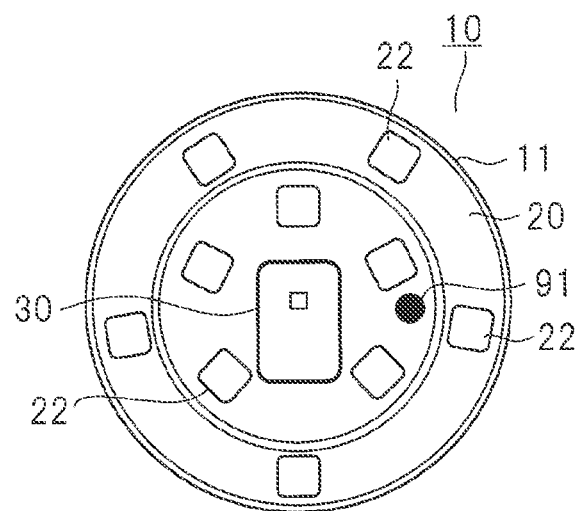

In an example of FIGS. 11(A) and 11(B), the optical unit 30 is positioned at the horizontal placement layout. An end of the board 21 for the illumination light source 20 is extended vertically to be formed into a cylindrical shape as well as extended also horizontally therefrom to form a flange. The plurality of semiconductor light-emitting elements (LED) 22 are structurally mounted on the upper and lower surfaces of the board 21, on the outer peripheral surface of a cylindrical shape portion, and on a lower surface of the flange. Also in this example, the optical unit 30 is located substantially at the center of beams of downward illumination light. Incidentally, the location of the optical unit 30 may be not substantially at the center of beams of downward illumination light. It may be arranged on an end side of beams of downward illumination light, i.e., near a side face of the cylindrical shape.

In addition to the diffusing panel 12 (lower diffusing panel) on the lower surface of the casing (shade) 11, another diffusing panel (upper peripheral diffusing panel) is attached to the casing (shape) 11 so as to cover the upper surface of the casing (shape) 11 and a part (upper part) of its outer periphery. In such a configuration, in addition to the above effect, the illumination light can be emitted not partiality but peripherally including the upper surface and sides of the lighting apparatus 10 with the image-projecting function, and functions also as indirect illumination (ceiling-side indirect illumination function+wide range illuminating function) since a ceiling etc. can be illuminated by the upward illumination light.

Such a configuration having an illumination function of emitting the illumination light in the plurality of different directions and an image-projecting function allows changes of the plurality of combination modes of the illumination light emission and the image-projecting light projection. For example, control may be performed to switch a mode in which only the image-projecting light is projected downward, a mode in which the illumination light is emitted downward while the image-projecting light is not projected, a mode in which the illumination light is emitted sideways while the image-projecting light is not projected, a mode in which the illumination light is emitted downward and sideways while the image-projecting light is not projected, and a mode in which the illumination light is emitted sideways and the image-projecting light is projected downward.

<Ceiling-Type Lighting Apparatus with Image-Projecting Function>

Figure 12A:
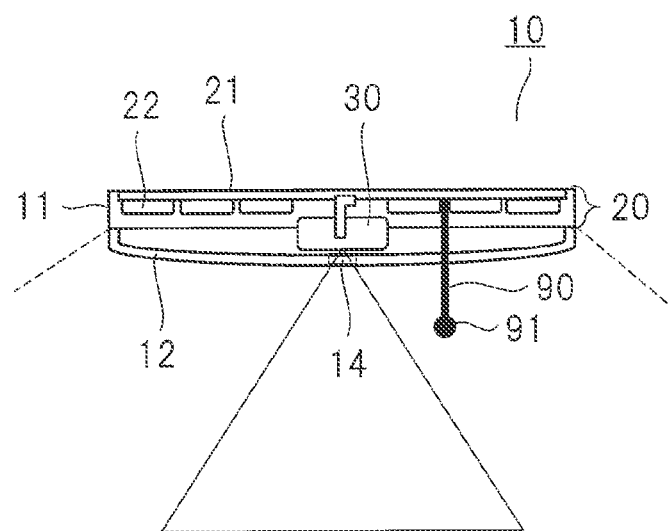
FIG. 12(A) is a side view and FIG. 12(B) is a bottom view for explaining an example of layout (arrangement) of the optical unit and the illumination light source in the casing of the lighting apparatus according to the present invention.
Figure 12B:
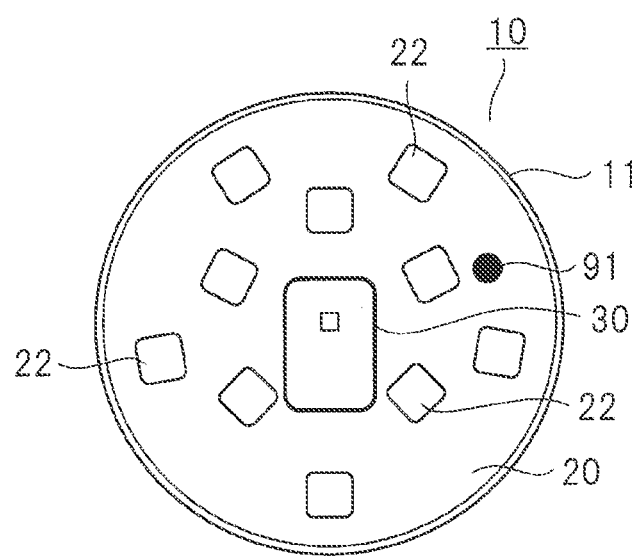

FIG. 12(A) is a side sectional view of a ceiling-type lighting apparatus 10 with the image-projecting function, and FIG. 12(B) is a bottom view of the same. In this example, the optical unit 30 is positioned at the horizontal placement layout. Attached to an interior bottom surface of the casing 11 which is the body of the lighting apparatus is the board 21 for the illuminating light source which has the plurality of semi-conductor light-emitting elements (LED) 22. Simultaneously therewith, attached to the opening surface side on the lower side of the enclosure 11 of Figure is the diffusing panel 12 so as to cover it. Arranged inside is the optical unit 30 so as to be positioned substantially at the center of beams of illumination light.

In such a layout (arrangement), the lighting apparatus with the image-projecting function as a whole is reduced in size vertically, that is, the lighting apparatus with the image-projecting function having a thin structure can be achieved.

In many cases, an ordinary ceiling-type lighting apparatus without an image-projecting function is structured to be thin and wide along a ceiling surface. By realizing the lighting apparatus with the image-projecting function having the thin structure as shown in FIGS. 12(A) and 12(B), replacement with the conventional and ordinary ceiling-type lighting apparatus is readily made, and thus a greater product value can be enhanced.

Figure 13A:
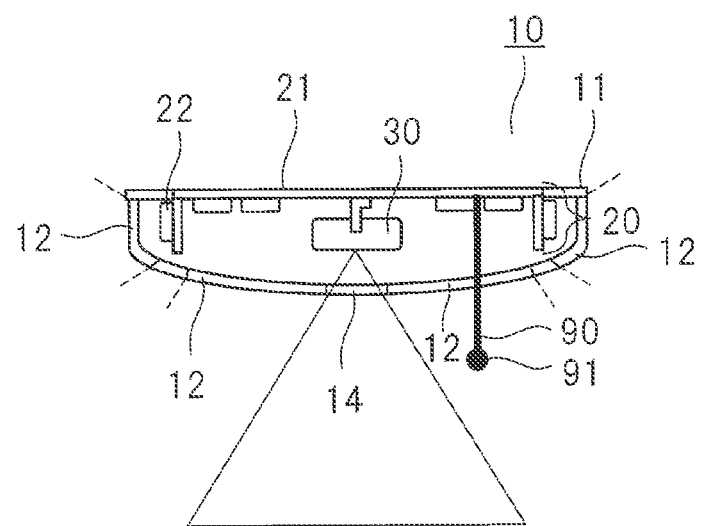
FIG. 13(A) is a side view and FIG. 13(B) is a bottom view for explaining an example of layout (arrangement) of the optical unit and the illumination light source in the casing of the lighting apparatus according to the present invention.
Figure 13B:
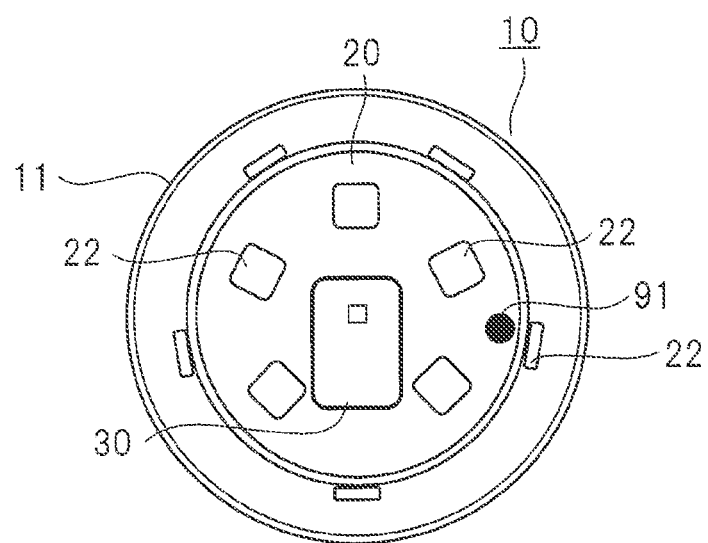

In an example of the ceiling lighting apparatus 10 with the image-projecting function as shown in FIGS. 13(A) and 13(B), the optical unit 30 is positioned at the horizontal placement layout. Such a structure thereof is an example that the end of the board 21 for the illumination light source 20 is extended vertically to be formed into a cylindrical shape, the plurality of semiconductor light-emitting elements (LED) 22 are mounted on its bottom surface, and also on the outer peripheral surface of the cylindrically shaped board 21. This allows the illumination light to be emitted not only in the downward direction but also in the sidewise direction.

Incidentally, in this example, the optical unit 30 is arranged so as to be positioned substantially at the center of beams of downward illumination light. Incidentally, the position of the optical unit 30 may be not substantially at the center of beams of downward illumination light. Its location may be an end side of beams of downward illumination light, i.e., near a side face of the cylindrical shape. In addition to the diffusing panel 12 (lower diffusing panel) covering the opening surface on the lower surface of the casing 11, another diffusing panel 12 (side diffusing panel) is attached also to the periphery of the casing 11. In such a configuration, in addition to the above effect by the horizontal placement of the optical unit, the illumination light can be illuminated also in the sidewise direction (wide-range illumination function) of the lighting apparatus 10 with the image-projecting function.

Such a layout (arrangement) of the lighting apparatus with the image-projecting function can achieve the lighting apparatus with the image-projecting function having a vertically thin structure, and the illumination light can be illuminated also in the sidewise direction (wide-range illumination function) of the lighting apparatus 10.

Similarly to FIG. 10 or 11, the example of FIG. 13 has the illuminating function of emitting the illumination light in a plurality of different directions, and therefore may perform the control for changing a plurality of modes about the illumination light emitted in a plurality of directions by the illuminating function and the image-projecting light by the image-projecting function as described in FIG. 10 or 11.

Next, described by using FIG. 14 will be about examples of lighting control over an illumination light source of the illuminating unit (the reference numeral 200 in FIG. 3) and an image-projecting light source of the projection-type image display unit (the reference numeral 100 in FIG. 3) that are included in the lighting apparatus with the image-projecting function (the reference numeral 300 in FIG. 3) having the above configurations. Incidentally, in the following description and drawings, "PJ unit" is an abbreviation of the projector unit, i.e., projection-type image display unit.

listed in FIG. 14 are examples of lighting control by the lighting apparatus with the image-projecting function according to one embodiment of the present invention. In the list of FIG. 14, "OPERATION HARD" represents configurations for user operations. "CONFIGURATION AND CONTROL" represents respective configurations and control examples. The lighting apparatus with the image-projecting function according to the one embodiment of the present invention may be equipped with a function of one of a plurality of lighting control examples shown in the list of FIG. 14. Or, it may be equipped with functions of two or more of the plural lighting control examples shown in the list.

Lighting control example 1 is an example in which one or each of the operation input unit 301, the wall-mounted operation input unit, and the remote controller is provided with an illuminating unit ON/OFF operation button and a PJ unit ON/OFF operation button, and thereby the user is allowed to arbitrarily change lighting ON/OFF of each of the illuminating unit and PJ unit.

Lighting control example 2 is an example in which: the operation input unit 301 or the wall-mounted operation input unit is configured by a touch sensor; touch sensing areas for the illuminating unit and PJ unit are provided to each of them; and the user is allowed to change the lighting ON/OFF of each of the illuminating unit and PJ unit according to the touched areas.

Lighting control example 3 is an example in which: the operation input unit 301 or the wall-mounted operation input unit is provided as a touch sensor; a touch sensing area for the illuminating unit and a touch sensing area for the PJ unit are shared; and a plurality of lighting states including the lighting ON/OFF of the illuminating unit and the lighting ON/OFF of the PJ unit can be changed by a toggle-switching operation depending on the detected number of times of touches made in the sensing area.

In the description of embodiments of the present invention, "toggle-switching operation" means an operation of changing two or more modes by repeating the same action. Therefore, the modes that can be changed include three or more modes. Similarly, in the description of embodiments of the present invention, "toggle switch" means a switch that can be repeatedly subjected to the same operation by the user to change two or more modes. The same operation is, for example, pressing, or pulling, etc. of the switch. Repeatedly touching etc. a given area of a touch panel are also included in examples of the toggle-switching operation.

Lighting control example 4 is an example in which the operation input unit 301 or the wall-mounted operation input unit is provided with a rotary switch; and a plurality of lighting states including the lighting ON/OFF of the illuminating unit and the lighting ON/OFF of the PJ unit can be changed depending on a rotation angle or position of the rotary switch.

Lighting control example 5 is an example in which: the operation input unit 301 is configured by a drawstring-type toggle switch; and a plurality of lighting states including the lighting ON/OFF of the illuminating unit and the lighting ON/OFF of the PJ unit can be changed by a toggle-switching operation depending on the number of drawstring times by the drawstring-type toggle switch.

In the configurations of lighting control examples 2, 3, 4, and 5, even use of an operation means similar to that by a conventional lighting apparatus without the image-projecting function such as a touch sensor, drawstring-type toggle switch, and a rotary switch enables a change in the lighting ON/OFF of the PJ unit. Therefore, there is an effect of allowing the user to intuitively understand how to operate the lighting apparatus, even if the user first uses it without a need of leaning a new, specific operation.

Lighting control example 6 is an example in which the wall-mounted operation input unit has one ON/OFF switch and the remote controller is provided with a button for the lighting ON/OFF of the illuminating unit as well as a button for the lighting ON/OFF of the PJ unit. In this case such control becomes possible that: only the illuminating unit is turned on by an ON operation on the wall-mounted operation input unit; during an ON state of the wall-mounted operation input unit, the lighting ON/OFF of the PJ unit as well as the illuminating unit by the remote controller can be operated; and then both of the illuminating unit and the PJ unit are turned OFF (extinguished) by an OFF operation of the wall-mounted operation input unit. In this case, if the wall-mounted operation input unit is simplified in configuration and such a wall-mounted operation input unit is solely used, the lighting apparatus with the image-projecting function can be handled as an equivalent to the conventional lighting apparatus without the image-projecting function. This makes the lighting apparatus of the present invention highly compatible with the conventional lighting apparatus, thus allowing the user to handle the lighting apparatus of the present invention easily.

The lighting apparatus with the image-projecting function according to the one embodiment of the present invention can change a plurality of lighting states including the lighting ON/OFF of the illuminating unit and the lighting ON/OFF of the PJ unit by the lighting control described in FIG. 14. Specific examples of the plurality of lighting states will then be described in reference to FIG. 15. In a list shown in FIG. 15, ON/OFF of "illuminating unit" represents a mode in which the illumination light source of the illuminating unit is turned on/off, and ON/OFF of "PJ unit" represents a mode in which the image-projecting light source of the projection-type image display unit is turned on/off. In a "MODIFICATION MODES ETC." column, explanation is made when there are a plurality of kinds in an ON mode or OFF mode.

The lighting states changed by the lighting apparatus with the image-projecting function according to the one embodiment of the present invention include, for example, lighting states 1, 2, 3, and 4, etc. shown in the list of FIG. 15. The lighting state 1 is a mode in which the illumination light source of the illuminating unit and the image-projecting light source of the projection-type image display unit are both OFF. The lighting state 2 is a mode in which the illumination light source of the illuminating unit is on while the image-projecting light source of the projection-type image display unit is OFF. The lighting state 4 is the mode in which the illumination light source of the illuminating unit is OFF while the image-projecting light source of the projection-type image display unit is ON. It is preferable that the lighting apparatus with the image-projecting function be capable of changing these lighting states 1, 2, 3, and 4. The lighting apparatus with the image-projecting function may have (or may not have) the lighting state 3 in which the illumination light source of the illuminating unit and the image-projecting light source of the projection-type image display unit are both on.

The lighting state 3 includes various phases. For example, (1) in the lighting state 3, the illumination light source of the illuminating unit is set at a lighting state of the lighting state 2, the image-projecting light source of the projection-type image display unit is set in the lighting state 4, and then both sources may be turned on as it is.

(2) The illumination light source of the illuminating unit in the lighting state 3 may be smaller in a light amount of the lighting (lower brightness) than the illumination light source of the illuminating unit in the lighting state 2. This is for making a projected image formed by the projection-type image display unit seen more easily. This light amount change process is made possible by the control unit 201 of the illuminating unit 200 of FIG. 3 controlling the light-emitting element drivers.

(3) The lighting of the illumination light source of the illuminating unit in the lighting state 3 may be changed in the number of lighting light-emitting elements in comparison with that of the illumination light source of the illuminating unit in the lighting state 2 (reduction in the number of lighting light-emitting elements). This is also for making the projected image by the projection-type image display unit seen more easily. A process of changing the number of lighting light-emitting elements is made possible by the control unit 201 of the illuminating unit 300 of FIG. 3 controlling the light-emitting element drivers to change the number of driven light-emitting element drivers. For example, some of the plural light-emitting element drivers may be driven while the rest of the light-emitting element drivers may not be driven.

(4) The lighting of the illumination light source of the illuminating unit in the lighting state 3 may be changed so as to have a light distribution characteristic different from that of the lighting of the illumination light source of the illuminating unit in the lighting state 2. Changing the light distribution characteristic means that when the lighting apparatus with the image-projecting function having the layout shown in FIG. 10, 11, or 13, etc. can emit beams of illumination light in a plurality of directions, the respective light amounts of beams of illumination light emitted in the plurality of directions are changed. For example, in the lighting state 2, the beams of illumination light in a peripheral or ceiling direction are emitted simultaneously in addition to those in a lower direction. In the lighting state 3, the light amount of beams of illumination light in the peripheral or ceiling direction may be kept as it is or reduced while only the beams of illumination light in the lower direction may be turned off.

In the lighting state 2, beams of illumination light in the peripheral or ceiling direction are emitted simultaneously in addition to those in the lower direction. In the lighting state 3, the light amount of beams of illumination light in the peripheral or ceiling direction is reduced, but the light amount of beams of illumination light in the lower direction may be reduced larger than that of the beams of illumination light in the peripheral or ceiling direction. In the lighting state 2, the beams of illumination light in the lower direction are emitted, and in the lighting state 3, the beams of illumination light in the lower direction are turned OFF while the beams of illumination light in the peripheral or ceiling direction may be turned ON. Even in any of them, a ratio of the light amount of beams of illumination light in the lower direction to those of all the beams of illumination light in the peripheral or ceiling direction and the lower direction in the lighting state 3 is reduced lower than that in the lighting state 2, and thereby the projected image formed by the projection-type image display unit is made to seen more easily.

The process of changing the number of lighting light-emitting elements is made possible so that: light-distribution directions of sets of light-emitting elements controlled by the plurality of light-emitting element drivers are made different from each other in the illuminating unit 200 of FIG. 3; and the control unit 201 controls each light-emitting element driver to vary the brightness and the number of light-emitting elements in the lighting states 2 and 3.

Incidentally, when the light amount or light distribution characteristic is changed in switching the lighting state 2 to the lighting state 3, the change may be made instantaneously gradually. The gradual changing may make it possible for the user to recognize that operation quality is high as a product in comparison therewith.

Specific examples of switching a plurality of lighting states through the toggle-switching operations in the lighting control examples by the lighting apparatus with the image-projecting function of FIG. 14 will then be described.

FIG. 16(A) is a first toggle-switching operation example. Each of the lighting states described in FIG. 15 may be configured so as to repeat the lighting state 1→lighting state 2→lighting state 4→lighting state 1.

FIG. 16(B) is a second toggle-switching operation example. Even of the lighting states described in FIG. 15 may be configured so as to repeat the lighting state 1→lighting state 2→lighting state 3→lighting state 4→lighting state 1.

FIG. 16(C) is a third toggle-switching operation example. The lighting state 3 of the second toggle-switching operation example may be divided into a plurality of lighting states (patterns 1 and 2) different in light amount, number of lighting light-emitting elements, and light distribution characteristic, and a change therebetween may be made. When the lighting state 3 is divided into the plurality of lighting states different in light amount, number of lighting light-emitting elements, and light distribution characteristic in the third toggle-switching operation example, if the illumination light overlaid on the light projected from the PJ unit is made equal to or lower than that in a state immediately before the state each time the switch is changed, a change in the light amount of illumination light leads naturally to the lighting state 4 of making the illumination light turned OFF, and thus the user hardly has a sense of incongruity about the change.

According to the configurations and control of the lighting apparatus with the image-projecting function according to the one embodiment of the present invention, which have been described in reference to FIGS. 14 to 16, the lighting and extinction of the illumination light source of the illuminating unit and of the image-projecting light source of the projection-type image display unit can be changed preferably, and this makes the lighting apparatus convenient for the user.

The projection-type image display unit 100 can display a setting screen for a projected image on a projection surface. The setting screen may have such a configuration to make settable various directions such as a direction of a displayed image defaulted in turning on the lighting source of the projection-type image display unit 100.

Settings about various directions made by the projection-type image display unit 100 will be described in reference to FIGS. 17A, 17B, 17C, 17D, and 17E.

As shown in FIG. 17A, X and Y directions, which will be referred to as horizontal directions in the following description, and the Z direction, which will be referred to as the vertical direction, will first be defined. An upper surface 61 of a table 60 is parallel with an X-Y plane, which is the horizontal plane. Illumination light 2 from the illuminating unit 200, and a projected image 1 from the projection-type image display unit 100 is projected on the upper surface 61.

Examples of setting the direction of the defaulted screen will then described using FIG. 17B. For example, as shown in 17B (1), (2), (3), and (4), any one of four directions rotated by 90 degrees can be set in the direction of the defaulted screen (so as to properly display characters and images from a direction of reading characters "STARTUP"). The direction of the defaulted screen means, for example, a direction of an image that is displayed first when the PJ unit is turned on after the setting. At this time, a display system operating on the assumption that the image is displayed on the horizontal plane such as the projection onto the table surface as shown in FIG. 17A cannot set the displayed direction of the default based on a gravity sensor, unlike ordinary smart phones and tablet terminals. The direction of the defaulted screen, therefore, should preferably be set manually. It may be displayed by user's selection made via a menu indication.

Another direction setting example will then be described using FIG. 17C. For example, when the lighting apparatus 300 with the image-projecting function can communicate with on-line appliances (e.g., TV, air conditioner, and refrigerator, etc.) located in household (home) through a wired or wireless network using the communication unit 132, and has a function of operating these on-line appliances or a function of working in coordination with the on-line appliances, a display screen 1700 of the PJ unit and the directions of located positions of the on-line appliances may be set initially as shown in FIGS. 17C (1), 17C (2), 17C (3), and 17C (4).

For example, in FIG. 17C (1), four arrows are displayed in four directions; an indication 1701 of a TV, which is one of the household on-line appliances, is displayed first; and by the user's operation input through the operation input unit 107, the interactive function unit 120, or the operation signal input unit 301, the indication 1701 of the TV near a specific arrow 1703 is moved (indication 1702). As a result, setting information indicating that the located direction of the TV is a direction of the arrow 1703 (+x direction in this example) is stored in the non-volatile memory 108 or storage unit 170 of the projection-type image display unit in the lighting apparatus 300 with the image-projecting function.

An example of FIG. 17C (2) is an example in which the process of FIG. 17C (1) is performed to a refrigerator and an air conditioner, etc. besides the TV. In this example, the TV, the refrigerator, and the air conditioner are set so as to be located in the +X direction, the +Y direction, and the −X direction, respectively.

An example of FIG. 17C (3) shows that: the number of directions in which the on-line appliances will be located is not limited to four; and may be determined by other number of directions. This example has eight directions. This example is set so that the TV is located in the +X/+Y directions.

An example of FIG. 17C (4) is a diagram showing that a plurality of on-line appliances may be set in the same located direction. This example is set so that the refrigerator is located in the +Y direction while the air conditioner and TV are both located in the −X direction.

Functions that can be achieved by setting the directions of located position of the on-line appliances cooperatable thus will be described using FIG. 17D. FIG. 17D (1) is an example about a case of setting positions of respective cooperation apparatuses. This example is set so that the TV, the refrigerator, and the air conditioner are located in the +X direction, the +Y direction, and the −X direction, respectively. In FIGS. 17D (2) to 17D (4), an operation at a state of this setting example will be described below.

For example, as shown in FIG. 17D (2), when an on-screen flick operation in a direction (+X direction) set initially as the located direction of the TV on the image projection surface is detected using the interactive operation detecting function of the interactive function unit 120, it can be used to perform control for sending a control signal indicative of monitor display ON etc. to the TV. The sent control signals and the other examples include, for example, a control signal indicative of monitor display OFF, a control signal indicative of channel changing, and a control signal for succeeding to the viewing of an image that is obtained and viewed (reproduced) by the projection-type image display unit through a network (image ID, acquisition URL, and reproduction passage time information, etc.).

Incidentally, the TV having received the image-viewing succeeding control signal acquires the image through the network based on those pieces of information, and may succeed to and reproduce the reproduction passage time information (viewing position on the time axis). An example of control information on the refrigerator includes control information on a request for transmitting various pieces of status information. An Example of control information on the air conditioner includes ON control information and OFF control information on cooling or heating. Pieces of control information described above are examples. In this embodiment, the control information to be sent to the TV is not limited to these examples.

As shown in FIG. 17D (3), for example, menu windows (1711, 1712, and 1713) for operating the on-line appliances (e.g., TV, air conditioner, and refrigerator, etc.) through the interactive function can be arranged and displayed in directions close to the located positions of the respective on-line appliances.

As shown in FIG. 17D (4), for example, a figure or mark having a shape indicating which on-line appliance has issued a notification may be displayed (displayed example 1714) so that notification information from each on-line appliance (e.g., TV, air conditioner, and refrigerator, etc.) is recognized as a notification issued from near the located position of each on-line appliance.

Even in each case of FIGS. 17D (2), 17D (3), and 17D (4), by using setting information on the directions of the on-line appliances onto the display screen, information and an operation interface easily understood intuitively by the user can be provided.

Examples of setting an azimuth as initial setting will then be described using FIG. 17E. For example, an arrow capable of rotational display indicating the north direction is represented, and thereby the north direction may be set by designating a tip position of the arrow as a desired position using the interaction function. FIG. 17E (1) is an example of setting the north direction of default, and FIG. 17E (2) is a desired example of setting the north direction designated by the interactive function.

By setting the azimuth in such a manner, when a map is displayed by a map-display application program, the map can be rotated and adjusted to match the set north direction to the north direction on the map displayed by the application program. For example, FIG. 17E (3) is a displayed example of the map-display application program when the default north direction is set at FIG. 17E (1). Incidentally, the map-display application program may be, for example, stored in advance in the storage unit 170 of the projection-type image display unit 100 at its shipment, or may be acquired from a server connected to the Internet via the communication unit 132, and stored in the storage unit 170. The application program can be executed by expansion into the memory 109 and cooperation with the control unit 110.

FIG. 17E (4) is a displayed example of the map-display application program when the north direction designated by FIG. 17E (2) is set. At this time, the map direction is rotated according to the above azimuth setting information. However, characters displayed on the map may be, for example, displayed so as to match the displayed direction of the default set in FIG. 17B. At this time, as described above, the displayed direction of the default cannot be set unlike general smart phones and tablet terminals by a gravity sensor in a display system premised on the projection of the image onto the horizontal plane with a body fixed to the ceiling or wall similarly to the projection onto the desk from the projection-type image display unit 100 of the lighting apparatus 300 as shown in FIGS. 1, 2 and 17A.

In the display system that projects the image on the horizontal plane and in which its body is also fixed to the ceiling, and wall, etc. of the room as shown in FIGS. 1, 2, and 17A, it is not easy to enhance accuracy of an azimuth sensor in the body by the rotational operation since the body is not easily rotated unlike a body-rotatable apparatus such as a general smart phone or tablet terminal rotatable by a hand(s). For this reason, the azimuth are preferably set manually as mentioned in FIG. 17E.

That is, in order to perform the preferable display to the user by a map-display application program etc. in the display system that projects the image onto the horizontal plane and in which the body is fixed to the ceiling or wall etc. of the room as shown in FIGS. 1, 2, and 17A, it is desired to use character-display-direction information manually set without using the gravity sensor and direction information manually set without using the azimuth sensor. According to these character-display-direction information and direction information set manually without using the azimuth sensor, a relative angle between the character direction by the map display application and the displayed map is changed.

Incidentally, the azimuth by the map display application may be manually set finally, and the azimuth information using the azimuth sensor as temporary azimuth information at the setting may be displayed as initial display at the setting.

An example of an error notification method of notifying the user of faults of the lighting apparatus 300 will then be described in reference to FIG. 18A. Incidentally, in the following description, the control unit 110 and the control unit 201 control detection of the faults and a response to them separately or cooperatively. In this case, these control units may be regarded as a single integrated control unit. The control unit 110 and control unit 201 may actually be structured as a single control unit, and if so, the single control unit may serve as a function of a lighting apparatus 300 that is outside the projection-type image display unit 100 and illuminating unit 200.

As shown in FIG. 3, the lighting apparatus 300 includes the light source 105, the power supply 106, and the cooling unit 115 of the projection-type image display unit 100. When faults arise at any one of them, however, the control unit 110 determines that such a situation is an error state, and carries out control for rendering the light source 105 incapable of lighting. The lighting apparatus 300 recognizes this state as a lighting failure error of the light source of the projection-type image display unit 100. The lighting apparatus 300 includes the power source 202, the respective light-emitting element drivers 210 and 220, and the respective light-emitting elements 211, 212, 213, 221, 222, and 223, etc. in the illuminating unit 200. When faults arise at any one of them, however, the control unit 201 determines that such a situation is an error state, and carries out control for rendering the light source 202 incapable of lighting or control of any one of the light-emitting element drivers to render all or some of the light-emitting elements incapable of lighting. The lighting apparatus 300 recognizes this state as a lighting failure error of the light-emitting element of the illuminating unit 200.

FIG. 18A shows an example in which the lighting apparatus 300 can emit image-projecting light 1803 (single-dot chain lines) by the projection-type image display unit 100 onto the upper surface 61 of the desk 60, and emit illumination light 1802 (dotted lines) from the illuminating unit 200. Incidentally, if the light source of the projection-type image display unit 100 is in the state of lighting failure error, the projection-type image display unit 100 cannot emit the image-projecting light 1803 (single-dot chain lines). When all the light-emitting elements of the illuminating unit 200 are in the states of lighting failure errors, the illuminating unit 200 cannot emit the illumination light 1802 (dotted lines).

Several methods of notifying the user of these lighting failure errors will hereinafter be described.

A light-emitting indicator 1801 such as a LED may be provided to an exterior of the lighting apparatus 300 so that these error states are indicated by lighting or blinking of the indicator and color of light emitted from the indicator to inform the user of the errors.

When a lighting failure error occurs at the light source of the projection-type image display unit 100, consecutively blinking the light-emitting elements of the illuminating unit 200 causes the illumination light 1802 (dotted lines) to blink, and thereby the user may be informed of the lighting failure error of the light source of the projection-type image display unit 100. In this case, since consecutively blinking the light-emitting elements of the illuminating unit 200 generally for a long time may give the user an uncomfortable feeling, the number of blinking light-emitting elements may be reduced. Further, the light-emitting elements may be configured so as to blink several times only right after an instruction to turn ON the light source of the projection-type image display unit 100 is inputted on the remote controller etc.

When a lighting failure error occurs at the light-emitting elements of the illuminating unit 200, the error is indicated in the form of a mark or text in the projected image formed by the projection-type image display unit 100. In the above manner, the user can be preferably informed of each lighting failure error state.

When the illuminating unit 200 has a function of detecting a degree of deterioration of each light-emitting element, the control unit 201 may notify the display apparatus 300 with the communication function of the degree of deterioration of the light-emitting element of the illuminating unit 200 via the control unit 110 and the communication unit 132, so that the display apparatus 300 with the communication function may be configured so as to display the degree of deterioration on the display unit and inform the user of it.

As described in FIG. 18A, when the lighting failure error occurs at the light-emitting elements of the illuminating unit 200, an example in which the error is indicated in the form of the mark or text in the projected image formed by the projection-type image display unit 100 will be described in FIG. 18B. FIG. 18B (1) is an example in which the illuminating unit 200 side of the lighting apparatus 300 is in the state of lighting failure error, and thereat a mark 1811 indicating the lighting failure error is displayed in the projected image formed by the projection-type image display unit 100. Using a mark not occupying a large area in the image projection surface allows a reduction in obstruct in viewing the image.

FIG. 18B (2) is an example in which the light-emitting element on the illuminating unit 200 side of the lighting apparatus 300 is in the state of lighting failure error, and thereat a text 1812 indicating the lighting failure error is displayed in the projected image formed by the projection-type image display unit 100. In addition to the text 1812, an URL 1813 for a support Web page that provides information on LED replacement etc. may also be displayed. When a server on the Internet can be accessed through the communication unit 132 of the lighting apparatus 300, a hyperlink text may be displayed in place of the URL so that the Web page can be browsed through a browser using touching detection on the image projection surface or selective detection on the remote controller by the interactive function unit 120.

Incidentally, such a configuration may be made that: the screen of FIG. 18B (1) is displayed first; a mark indicating the lighting failure error of the light-emitting element on the illuminating unit 200 side of the lighting apparatus 300 is selected using the touching detection on the image projection surface or selective detection on the remote controller by the interactive function unit 120; and then the screen of FIG. 18B (1) is shifted to the screen of FIG. 18B (2). When the light-emitting element on the illuminating unit 200 side is in the state of lighting failure error, an indication shown in FIG. 18B (3) may be displayed in the projected image formed by the projection-type image display unit 100.

FIG. 18B (3) shows an example of making an inquiry indication 1814 for inquiring of the user whether the projection-type image display unit 100 carries out "substitute lighting" of the illuminating unit 200. "Substitute lighting" is a new lighting mode that is executed by the system of the present invention and in which: the illuminating unit 200 becomes in the state of lighting failure error; and thereat the projection-type image display unit 100 temporarily carries out image projection imitating the illumination in place of the illumination function. That is, when an operation signal instructing the light source of the illuminating unit 200 is inputted in an error state (hardware or software failure state) of being incapable of turning on the light source of the illuminating unit 200, a white image is displayed as a display image of the projection-type display unit 100, and thereby the new mode is a mode of serving as substitute illumination for the illumination light from the illuminating unit 200.

Namely, the projection-type image display unit 100 may be structured so as to display the white image as the display image of the projection-type image display unit 100 even in the lighting state 2 of FIG. 15. When carrying out the substitute lighting, the projection-type image display unit 100 may display a substantially circular image having a given color on the projection surface in attempting to make the image appear pseudo-illumination light. Also, the projection-type image display unit 100 may simply display a given color such as white uniformly across the entire range (rectangular) of the image display element.

When the user selects the "substitute lighting" on the screen of FIG. 18B (3), the indication 1815 as shown in FIG. 18b(4) prompting the user to select colors projected at a substitute indication may be displayed. In this case, the user may select a desired color from several colors of light indicating, by a kind of color, examples of ordinary electric lamp apparatuses such as "daylight white", "daylight color", and "electric bulb color". Depending on results of the selection, the control unit 110 of the projection-type image display unit 100 may display white images with different color temperatures such as 5000 K for "daylight white", 6500 K for "daylight color", and 2900 K for "electric bulb color". Namely, a maximum white image of the projection-type image display unit 100 is not illuminated simply but made closer to the color of the illumination light from an electric lamp apparatus as a pseudo-illuminating appliance, and further may reflect a taste for the user.

When the light-emitting element of the illuminating unit 200 has a light control function, the illuminating unit 200 may already select one of "daylight white", "daylight color", and "electric bulb color", etc. as its illumination mode. In such a case, when the illuminating unit 200 becomes the lighting failure error state and the user selects "substitute lighting" at the indication of FIG. 18B (3), the indication of FIG. 18B (4) may not be made immediately after the selection, and the "substitute lighting" mode may take over from a mode of having a kind of a illumination light color already selected as the illumination mode of the illuminating unit 200. In other words, a color tone of the initial image projected by the projection-type image display unit 100 in the "substitute lighting" mode may be changed according to the mode of having the kind of the illumination light color already selected as the illumination mode of the illuminating unit 200. Incidentally, it is preferable for the user that this color is configured changeably by an on-menu operation later.

The configuration described by FIGS. 18A and 18B can notify the user of the error state and prompt the user to select a response to the error state preferably.

Next, the lighting apparatus 300 according to the present embodiment may be configured to be capable of communicating with a display device 1821 with a communication function, such as a smart phone, as shown in FIG. 18C. For example, the display device 1821 with the communication function may have a communication unit capable of communicating, via a radio communication means, with the communication unit 132 that the lighting apparatus 300 has.

When the lighting apparatus 300 detects the lighting failure error state described in FIG. 18A, the control unit 110 controls (or the control unit 201 controls via the control unit 110) the communication unit 132 to send a notification of the lighting failure error to the display device 1821 with the communication function, and the display device 1821 with the communication function displays the notification on a display unit 1822 to inform the user of the lighting failure error. When the illuminating unit 200 has a detection function of a degree of deterioration of each light-emitting element, the control unit 201 may send a notification of the deterioration degree of the light-emitting element to the display device 1821 with the communication function via the control unit 110 and communication unit 132, and the display device 1821 with the communication function displays the notification on the display unit to inform the user of the deterioration degree of the light-emitting element.

FIG. 18D shows examples of a display screen of the display device 1821 with the communication function in the system in which the lighting apparatus 300 sends the notification of the error state to the display device 1821 with the communication function as described in FIG. 18C.

FIG. 18D (1) is a display example in which the light source of the projection-type image display unit 100 side of the lighting apparatus 300 is in the state of lighting failure error. The indication 1831 indicating that the light source of the projection-type image display unit 100 is in the state of lighting failure error is displayed. In addition, the URL 1832 for a support Web page that provides information on lamp replacement etc. may also be displayed. Since the display device 1821 with the communication function is premised on having the communication function, a hyperlink text may be displayed in place of the URL so that the Web page may become browseable through a browser by touching on a touch panel.

FIG. 18D (2) is a display example in which the light-emitting element in the illuminating unit 200 side of the lighting apparatus 300 is in the state of lighting failure error. This display is basically the same as the display made in a projected image by the projection-type image display unit 100, which has been described in FIG. 18B. For example, an indication 1833 indicating that the light-emitting element included in the illuminating unit 200 is in the state of lighting failure error is displayed. In addition, the URL 1834 for the support Web page that provides the information on LED replacement etc. may also be displayed. Since the display device 1821 has the communication function, the hyperlink text may be displayed in place of the URL so that the Web page may be browseable through the browser by touching on the touch panel.

When the light-emitting element in the illuminating unit 200 side is in the state of lighting failure error, the indication as shown in FIG. 18D (3) may be displayed in the display device 1821 with the communication function similarly to that in the projected image by the projection-type image display unit 100 as described in FIG. 18B. FIG. 18D (3) shows an example of performing an inquiry indication 1835 for inquiring of the user whether the projection-type image display unit 100 carries out the "substitute lighting" by the illuminating unit 200. Explanation of the "substitute lighting" will be omitted for that of FIG. 18B. Selection may be made by the touch detection on the touch panel of the display device 1821 with the communication function. Selection information on execution of the "substitute lighting" is transmitted, via the communication function of the display device 1821 with the communication function, to the lighting apparatus 300, for example, to the communication unit 132 thereof, the control unit 110 controls the display element driving unit 103 and the power supply 106 through proper cooperation with the memory 109 based on the selection information, and thereby the execution of the "substitute lighting" may be configured.

When the "substitute lighting" is selected from the indication of FIG. 18D (3) in the same manner as selection from the indication in the projected image by the projection-type image display unit 100 as described in FIG. 18B, the indication 1836 as shown in FIG. 18D (4) prompting the user to select a projection color at the substitute display may be performed subsequently. The process of selecting the projection color and the process of taking over a mode of having a kind of a color of the illumination light at the substitute display subsequent to FIG. 18D (4) are the same processes described in FIG. 18B, and so their explanation will be omitted. The selection may be made by the touch detection of the touch panel in the display device 1821 with the communication function. Selection information on the projection color is transmitted, via the communication function of the display device 1821 with the communication function, to the lighting apparatus 300, for example, to the communication unit 132 thereof, the control unit 110 controls the display element driving unit 103 and the power supply 106 through proper cooperation with the memory 109 based on the selection information, and thereby a change of the projection color at the "substitute lighting" may be configured.

The configuration described by FIGS. 18C and 18D can notify the user of the error state and prompt the user to select a response to the error state through the display device 1821 with the communication function such as a smart phone, and the user can be provided with a system that is highly convenient for the user.

Other examples of error notification processes will then be described. If the lighting apparatuses 10 of FIGS. 1 and 2 (lighting apparatus 300 of FIG. 3) are shaken due to its located state or by an earthquake, etc., blurring of the image projected on the table occurs, and the user is difficult to view the image. Therefore, by adding an acceleration sensor to the lighting apparatus 300 shown in FIG. 3, the lighting apparatus 300 can detect vibrations and take measures to the vibrations. An existing technique may be adopted for vibration detection by the acceleration sensor. Given amount of or more than the acceleration may determine that given amount of or more than vibrations occur.

It is also possible that the vibrations are detected using an image captured by the operation detection sensor 350 of FIG. 3. That is, an image blur detection process is carried out on the image captured by the operation detection sensor 350, and when a magnitude of the blur becomes greater than a given magnitude, the presence of vibrations equal to or larger than the given amount of vibrations can be determined. Thus, a concept including a sensor for detecting the vibrations by the acceleration sensor, and a vibration detection sensor using the captured image of the operation detection sensor 350 is merely abbreviated as a vibration sensor, and will be described below.

FIG. 19 shows operational examples when the vibration sensor incorporated in the lighting apparatus 300 detects the given amount of or more than the given amount of vibrations. FIG. 19 (1) shows a state in which the projection-type image display unit 100 in the lighting apparatus 300 reproduces the image inputted from the image signal input unit 131 or the image 1841 stored in the storage unit. Here, when the vibration sensor incorporated in the lighting apparatus 300 detects the given amount of or more than the given amount of vibrations, a message 1842 of detecting the vibrations as shown in FIG. 19 (2) is outputted. Here, if the image displayed by the projection-type image display unit 100 is an operatable streaming reproduction image inputted from the image signal input unit 131 or a reproduction of the image stored in the storage unit 170, it is desirable to stop the image reproduction.

In stopping the reproduction of the operatable streaming reproduction image inputted to the image signal input unit 131, reproduction-stop instruction information may be transmitted via the communication unit 132 to an external device serving as an image source with respect to the image signal input unit 131. In this case, a message (or mark) 1843 indicating the stop of the image reproduction may be displayed as shown in FIG. 19 (2). Since the vibrations are possibly caused by the located state of the lighting apparatus 300, a message 1844 prompting the user to recheck the located state of the lighting apparatus 300 may also be displayed as shown in FIG. 19 (2). Incidentally, some users has a possibility of thinking such message display function and reproduction-image stop function unnecessary. For this reason, these functions may be configured so as to be turned off by an operation on the menu.

Next, operational examples in which the lighting apparatus 300 can receive an emergency earthquake warning (or broader emergency information on emergency situations including disasters etc.) through the communication unit 132 from an external server etc. on the network will then be described using FIGS. 19 (3) and 19 (4). FIG. 19 (3) is in the same image reproduction state as that shown in FIG. 19 (1). At this time, when the lighting apparatus 300 receives the emergency earthquake warning from the external server etc. through the communication unit 132, the control unit 110 may display an indication 1845 indicating that an earthquake is occurring or about to occur as shown in FIG. 19 (4). When the lighting apparatus 300 receives the emergency information on the emergency situations including the disasters etc., the control unit 110 may acquire types of emergency situations (earthquake, eruption, downpour, tsunami wave, tornado, riot, and war, etc.) stored by the emergency information, and display an indication indicating that such emergency situations have occurred.

When the image reproduction can be stopped similarly to FIG. 19 (2), an image-reproduction stop process is carried out. In this case, an indication 1846 indicating that the image reproduction has been stopped may be displayed. To allow the user to quickly acquire necessary information, a hyperlink icon 1847 providing a link to a news site on the Internet or a hyperlink icon 1848 providing a link to a disaster information site (or information acquisition site for responding to an emergency situation) may also be displayed. The interactive function 120 detects the user's selection of each of these icons and may display information provided by the link site.

Incidentally, a condition for making a shift to an earthquake notification display (emergency situation notification display) shown in FIG. 19 (4) may be immediately set right after the emergency earthquake warning (emergency information) from the external device is received or when the vibration sensor incorporated in the lighting apparatus 300 detects the vibrations after receiving the emergency earthquake warning (emergency information) from the external device. In the latter case, a process carried out in detecting the vibrations by the vibration sensor incorporated in the lighting apparatus 300 has a feature of including different processes depending on whether the emergency earthquake warning (emergency information) has been received or not as shown in FIG. 19 (2) and FIG. 19 (4). Incidentally, some users has a possibility of thinking the above message display function, hyperlink icon display function, and image-reproduction stop function necessary. For this reason, these functions may be configured so as to be turned off by the operation on the menu.

<Various Modifications>

Incidentally, the following modifications may be used as the embodiments of the above described lighting apparatus with the image-projecting function of the present invention.

The projection-type image display unit 100 may be structured so as to make the setting screen for the projected image displayable on the projection screen and so that a displayed screen can be set or selected on the setting screen when no input image signal is inputted to the image signal input unit 131 in the lighting state 3 or lighting state 4 of FIG. 15.

The projection-type image display unit 100 may be structured so as to transmit/receive the information to/from the external smart phone (communication device with a display unit) through the communication unit 132, and to change the direction of the projected image in connection with a change in the screen direction of the external smart phone (communication device with a display unit).

The lighting apparatuses with the image-projecting function according to various embodiments of the present invention have been described above. However, the present invention is not limited only to the embodiments described above and includes various modification examples. For examples, the embodiments above have been described about the entire system in detail so as to make the present invention easily understood, and the present invention is not always limited to the embodiment having all of the described constituent elements. Also, a part of the configuration of one embodiment may be replaced with the configuration of another embodiment, and the configuration of one embodiment may be added to the configuration of another embodiment. Furthermore, a part of the configuration of each embodiment may be added, eliminated or replaced with another configuration.

EXPLANATION OF LETTERS AND NUMERALS

10 . . . lighting apparatus; 11 . . . body (casing) (shade); 12 . . . diffusing panel; 20 . . . illumination light source; 22 . . . semiconductor light-emitting element (LED); 30 . . . optical unit; 32 . . . display element; 34 . . . projection optical system; and 35 . . . reflective mirror.

The invention claimed is:

1. A lighting apparatus comprising:
an illuminator configured to emit illumination light;
a projector configured to project an image; and
a transceiver capable of communicating with an on-line appliance located in a home,
wherein the projector can display a setting menu screen on which a display image by the projector is settable,
wherein the projector can project the image onto the horizontal plane, and
wherein the projector can project a menu screen for setting a located direction of the on-line appliance onto the horizontal plane on which the image is projected.

2. The lighting apparatus according to claim 1,
wherein a displayed position of a menu screen display or an information display about the on-line appliance in the projected image of the projector is changed depending on the located direction of the on-line appliance that is set via the menu screen for setting the located direction of the on-line appliance.

3. The lighting apparatus according to claim 1, comprising
an operation detector capable of detecting a user's flick operation on a projected image surface of the projector,
wherein when the operation detector detects the user's flick operation in the located direction of the on-line appliance that is set via the menu screen for setting the located direction of the on-line appliance, the transceiver transmits control information to the on-line appliance.

\* \* \* \* \*